United States Patent
Peters

(10) Patent No.: US 9,662,736 B2
(45) Date of Patent: May 30, 2017

(54) $CO_2$ GLOBULAR TRANSFER

(71) Applicant: Lincoln Global, Inc., City of Industry, CA (US)

(72) Inventor: Steven R. Peters, Huntsburg, OH (US)

(73) Assignee: Linclon Global, Inc., City of Industry, CA (US)

( * ) Notice: Subject to any disclaimer, the term of this patent is extended or adjusted under 35 U.S.C. 154(b) by 472 days.

(21) Appl. No.: 13/780,380

(22) Filed: Feb. 28, 2013

(65) Prior Publication Data
US 2014/0076858 A1 Mar. 20, 2014

Related U.S. Application Data

(63) Continuation-in-part of application No. 13/554,744, filed on Jul. 20, 2012, now Pat. No. 8,937,267, which
(Continued)

(51) Int. Cl.
*B23K 9/10* (2006.01)
*B23K 33/00* (2006.01)
(Continued)

(52) U.S. Cl.
CPC .............. *B23K 9/164* (2013.01); *B23K 9/092* (2013.01); *B23K 9/1012* (2013.01); *B23K 9/173* (2013.01)

(58) Field of Classification Search
CPC ...... B23K 9/091; B23K 9/092; B23K 9/1062; B23K 9/0953; B23K 9/093; B23K 9/164;
(Continued)

(56) References Cited

U.S. PATENT DOCUMENTS 4,366,362 A * 12/1982 Ohta ...................... B23K 9/167
219/123
RE33,330 E * 9/1990 Ogasawara et al. .... 219/137 PS
(Continued)

FOREIGN PATENT DOCUMENTS

DE 102006050297 4/2008

OTHER PUBLICATIONS

PCT/IB2014/000219—International Search Report and Written Opinion of the International Searching Authority mailed Sep. 22, 2014.

*Primary Examiner* — David Angwin
*Assistant Examiner* — Gyounghyun Bae
(74) *Attorney, Agent, or Firm* — Perkins Coie LLP

(57) ABSTRACT

The invention described herein generally pertains to a system and method for generating a negative polarity welding output current waveform to control a welding process. An electric arc welding system generates an electric welding waveform with portions in a negative polarity. A cycle of the electric welding waveform includes a background current phase, a short clearing ramp phase after the background current phase, a peak current phase, and a tail-out current phase of the electric welding waveform, wherein the peak current phase provides a negative peak current level, the tail-out current phase provides a monotonically increasing tail-out current level toward the positive background current level, and the short clearing ramp phase provides a decreasing current level in a positive polarity of current for the electric welding waveform.

11 Claims, 15 Drawing Sheets

Related U.S. Application Data is a continuation-in-part of application No. 12/163,047, filed on Jun. 27, 2008, now Pat. No. 8,373,093.

(51) Int. Cl.
*B23K 35/30* (2006.01)
*B23K 9/16* (2006.01)
*B23K 9/173* (2006.01)
*B23K 9/09* (2006.01)

(58) Field of Classification Search
CPC .... B23K 9/1012; B23K 9/173; B23K 9/0282; B23K 2201/06
USPC ..... 219/130.51, 130.21, 137 PS, 136, 130.1, 219/130.31, 130.32, 130.33, 130.4, 130.5, 219/137 R, 137 WM, 137.2, 124.1, 219/124.21, 124.22, 124.5, 125.1
See application file for complete search history.

(56) References Cited

U.S. PATENT DOCUMENTS

| | | | | |
|---|---|---|---|---|
| 4,954,691 A * | 9/1990 | Parks et al. | ............. | 219/137 PS |
| 5,003,154 A * | 3/1991 | Parks et al. | ............. | 219/137 PS |
| 5,495,091 A * | 2/1996 | Tabata | .................... | B23K 9/092 |
| | | | | 219/130.51 |
| 6,034,350 A * | 3/2000 | Heraly et al. | ............... | 219/130.4 |
| 6,051,810 A * | 4/2000 | Stava | ....................... | 219/137 PS |
| 6,204,476 B1 * | 3/2001 | Reynolds | ............... | B23K 9/091 |
| | | | | 219/130.51 |
| 6,297,473 B2 * | 10/2001 | Hiraoka | .................... | 219/125.12 |
| 6,384,376 B1 * | 5/2002 | Plottier et al. | ........... | 219/130.51 |
| 6,653,596 B2 * | 11/2003 | Blankenship | .......... | B23K 9/091 |
| | | | | 219/130.1 |
| 7,075,032 B2 * | 7/2006 | Karino | ................... | B23K 9/092 |
| | | | | 219/130.51 |
| 7,102,099 B2 * | 9/2006 | Huismann et al. | ...... | 219/130.51 |
| 7,358,459 B2 * | 4/2008 | Stava | ....................... | 219/130.51 |
| 7,842,903 B2 * | 11/2010 | Myers | ..................... | 219/130.51 |
| 2002/0130117 A1 * | 9/2002 | Briand et al. | ........... | 219/137 PS |
| 2006/0175313 A1 * | 8/2006 | Kooken | ................. | B23K 9/09 |
| | | | | 219/130.1 |
| 2006/0226131 A1 * | 10/2006 | Stava et al. | ............... | 219/130.33 |
| 2007/0102408 A1 * | 5/2007 | Peters | .................. | B23K 9/1062 |
| | | | | 219/130.51 |
| 2007/0170163 A1 * | 7/2007 | Narayanan et al. | ..... | 219/130.51 |
| 2007/0241087 A1 * | 10/2007 | Peters | .................. | B23K 9/0216 |
| | | | | 219/137 PS |
| 2008/0011728 A1 * | 1/2008 | Peters | .................. | B23K 9/1062 |
| | | | | 219/130.5 |
| 2009/0321402 A1 | 12/2009 | Doyle et al. | | |
| 2010/0096373 A1 * | 4/2010 | Hillen | ................ | B23K 26/1429 |
| | | | | 219/130.01 |
| 2013/0015170 A1 | 1/2013 | Peters | | |

\* cited by examiner

$CO_2$ GLOBULAR TRANSFER

PRIORITY

The subject application is a continuation-in-part of U.S. patent application Ser. No. 13/554,744, entitled "METHOD AND SYSTEM TO INCREASE HEAT INPUT TO A WELD DURING A SHORT-CIRCUIT ARC WELDING PROCESS" filed Jul. 20, 2012 which claims priority to U.S. patent application Ser. No. 12/163,047, entitled "METHOD AND SYSTEM TO INCREASE HEAT INPUT TO A WELD DURING A SHORT CIRCUIT ARC WELDING PROCESS", filed Jun. 27, 2008, the entireties of such disclosures are incorporated herein by reference.

CROSS-REFERENCE TO RELATED APPLICATIONS/INCORPORATION BY REFERENCE

U.S. patent application Ser. No. 12/163,047, filed on Jun. 27, 2008, is incorporated herein by reference in its entirety.

TECHNICAL FIELD

The invention described herein pertains generally to a system and method that relate to globular transfer between an electrode and a workpiece during a gas metal arc welding (GMAW) short-circuit arc process.

BACKGROUND OF THE INVENTION

Welding systems reside at the core of the modern industrial age. From massive automobile assembly operations to automated manufacturing environments, these systems facilitate joining in ever more complicated manufacturing operations. One such example of a welding system includes an electric arc welding system. This may involve movement of a consumable electrode, for example, toward a work piece while current is passed through the electrode and across an arc developed between the electrode and the work piece. For instance, CO2 globular transfer is a gas metal arc welding (GMAW) process that uses $CO_2$ as a shielding gas to facilitate transferring a molten ball formed on a distal end of an electrode to a workpiece. Globular transfer GMAW processes can be unstable and include more splatter than other arc welding processes often due to the larger wire sizes in comparison to other arc welding process. This leads to a slower arc welding process due to lower wire feed speed ranges.

As mentioned, a GMAW process are prone to instability and/or puddle splatter, and what is needed is an improved welding technique to perform globular transfer GMAW processes.

SUMMARY OF THE INVENTION

In accordance with the present invention, there is provided a method for using one or more portions in a negative polarity of current used in an arc welding process comprising the steps of: regulating an output current level of a waveform to a positive polarity background current level to sustain an electric arc between an electrode and a workpiece, producing a molten metal ball on a distal end of the electrode; dropping the output current level below the positive polarity background current level in response to the molten metal ball shorting to the workpiece and extinguishing the electric arc to allow the molten metal ball to wet into a puddle on the workpiece; automatically decreasing the output current level into a negative polarity below the positive polarity background current level to induce the molten metal ball to pinch off from the distal end of the electrode; increasing the output current level within the negative polarity toward the positive polarity background current level as the molten ball pinches off from the distal end of the electrode onto the workpiece to re-establish an electric arc between the electrode and the workpiece; decreasing the output current level within the negative polarity away from the positive polarity background current level to a negative peak current level of the waveform in response to re-establishing the electric arc; and increasing the output current level toward the positive polarity background current level producing a next molten metal ball on the distal end of the electrode.

In accordance with the present invention, there is provided a method for using one or more portions in a negative polarity of current used in an arc welding process comprising the steps of: regulating an output current level of a waveform to a positive polarity background current level to sustain an electric arc between an electrode and a workpiece, producing a molten metal ball on a distal end of the electrode; dropping the output current level below the positive polarity background current level into a negative polarity in response to the molten metal ball shorting to the workpiece and extinguishing the electric arc to allow the molten metal ball to wet into a puddle on the workpiece; dropping the output current level within the negative polarity to a negative peak current level in response to re-establishing the electric arc; and increasing the output current level toward the positive polarity background current level producing a next molten metal ball on the distal end of the electrode.

In accordance with the present invention, there is provided a gas metal arc welding (GMAW) system that generates an electric welding waveform between an advancing welding electrode and a metal workpiece that comprises: a first configuration of electronic components to generate a background current phase, a peak current phase, and a tail-out current phase of the electric welding waveform, wherein the background current phase provides a positive background current level, the peak current phase provides a negative peak current level, and the tail-out current phase provides a monotonically increasing tail-out current level toward the positive background current level; and a second configuration of electronic components to generate a pinch current phase of the electric welding waveform, wherein the pinch current phase provides a decreasing pinch current level in a positive polarity of current for the electric welding waveform after the background current phase.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
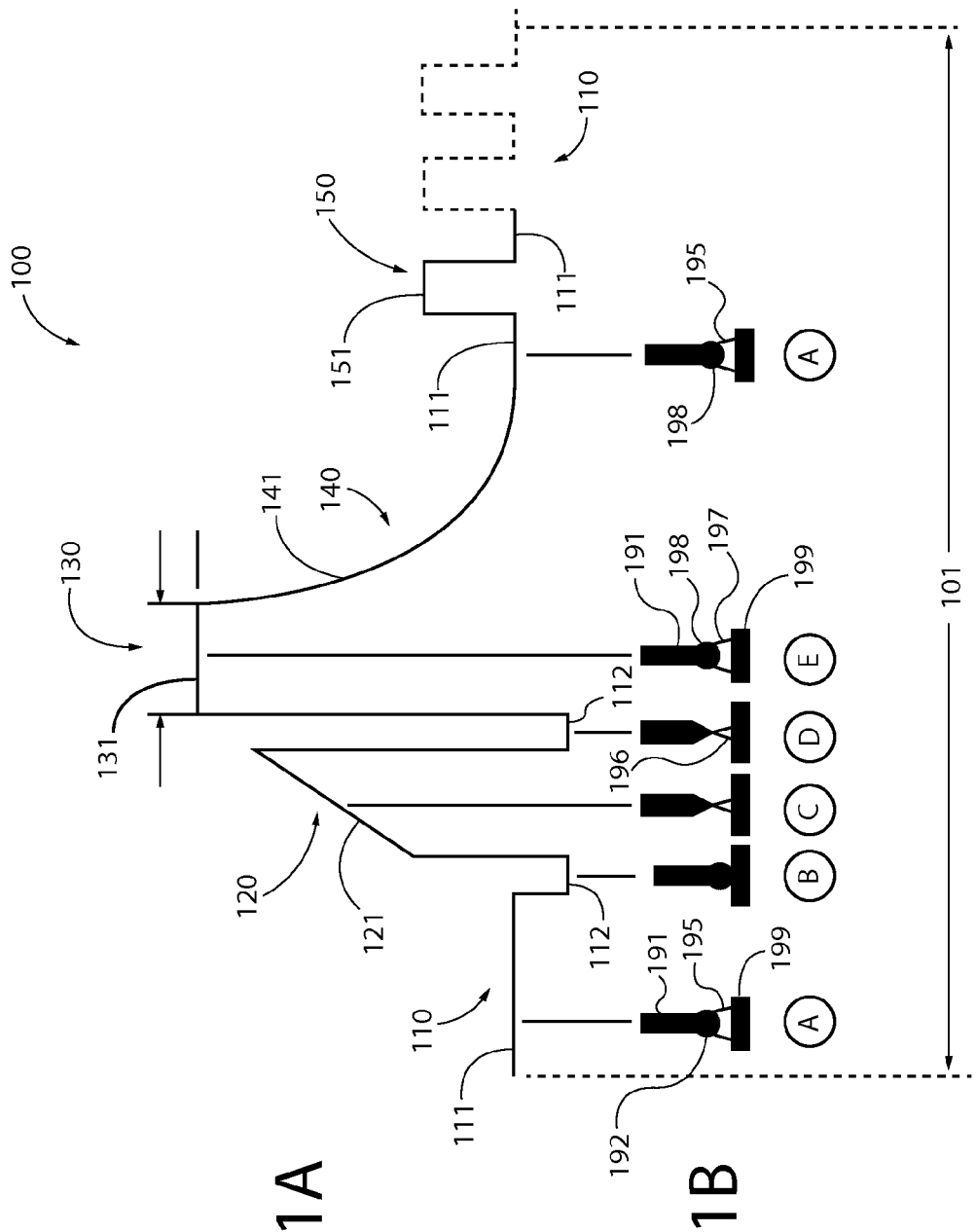
FIG. 1A illustrates an exemplary embodiment of a cycle of an electric welding waveform used in an arc welding process to increase heat input to a weld.
FIG. 1B illustrates the various stages of the arc welding process over the cycle of FIG. 1A using the electric welding waveform of FIG. 1A, showing the relationship between a welding electrode and a metal workpiece.

Embodiments of the invention relate to methods and systems that generally relate to generating a negative polarity welding output current waveform to control a welding process. An electric arc welding system generates an electric welding waveform with portions in a negative polarity. A cycle of the electric welding waveform includes a background current phase, a short clearing ramp phase after the background current phase, a peak current phase, and a tail-out current phase of the electric welding waveform, wherein the peak current phase provides a negative peak current level, the tail-out current phase provides a monotonically increasing tail-out current level toward the positive background current level, and the short clearing ramp phase provides a decreasing current level in a positive polarity of current for the electric welding waveform.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

FIG. 1A illustrates an exemplary embodiment of a cycle 101 of an electric welding waveform 100 used in an arc welding process to increase heat input to a weld. FIG. 1B illustrates the various stages (A-E) of the arc welding process over the cycle 101 using the electric welding waveform of FIG. 1A, showing the relationship between a welding electrode 191 and a metal workpiece 199. During an arc welding process, a series of electric arc pulses are generated between the advancing electrode 191 and the metal workpiece 199 using an electric arc welding system capable of generating the electric welding waveform 100 to produce the electric arc pulses. In general, the cycle 101 periodically repeats during the arc welding process to produce the resultant weld. However, the cycle 101 may repeat without the same number of heat increasing pulses 150 and possibly without a pinch current phase 120 if a short condition does not occur.

The cycle 101 of the electric welding waveform 100 includes a background current phase 110 providing a background current level 111, a pinch current phase 120 providing a monotonically increasing pinch current level 121, a peak current phase 130 providing a peak current level 131, and a tail-out current phase 140 providing a monotonically decreasing tail-out current level 141.

During the background current phase 110, an electric arc 195 is sustained between the electrode 191 and the workpiece 199 producing a molten metal ball 192 on a distal end of the electrode 191 (see stage A in FIG. 1B). At stage B, the molten metal ball 192, still connected to the electrode 191, shorts to the workpiece 199. When the short occurs, the arc 195 is extinguished and the current level of the waveform 100 is dropped at or below the background current level 111 to a current level 112, allowing the molten ball 192 to wet into a puddle on the workpiece 199.

During the pinch current phase 120, the current level of the waveform 100 is increased monotonically (e.g., ramped upward) above the background current level 111, providing the increasing pinch current level 121 which causes the shorted molten metal ball 192 to begin to pinch off from the distal end of the electrode 191 into the puddle of the workpiece 199 as shown in stage C of FIG. 1B. As the molten metal ball 192 is about to pinch off from the electrode 191, the current level of the waveform 100 is again dropped below the background current level 111 to a current level 112 to avoid spatter, and an arc 196 is re-established between the electrode 191 and the workpiece 199.

Once the arc 196 is re-established, the waveform 100 enters the peak current phase 130. During the peak current phase 130, the current level of the waveform 100 is increased to and held at the peak current level 131. In accordance with an embodiment, the peak current level 131 is the highest current level of the waveform 100 and establishes an arc 197 between the electrode 191 and the workpiece 199 of sufficient strength to begin forming a next molten metal ball 198 at the distal end of the electrode 191.

After the peak current phase 130, the waveform 100 enters the tail-out current phase 140. During the tail-out current phase 140, the current level of the waveform 100 monotonically (e.g., exponentially) decreases toward the background current level 111 providing the decreasing tail-out current level 141. The current of the waveform 100 inputs heat into the weld. The tail-out current phase 140 acts as a coarse heat control phase for the waveform 100 whereas the background current phase 110 acts as a fine heat control phase for the waveform 100. However, in certain arc welding applications, it may be desirable to provide additional heat input control.

After the tail-out current phase 140, the background current phase 110 is again entered, providing the background current level 111 and producing a substantially uniform next molten metal ball 198 at the distal end of the electrode 191 (stage A). During the background current phase 110, at least one heat-increasing current pulse 150 is generated, providing an intermediate current level 151 that is between the background current level 111 and the peak current level 131. The heat increasing current pulse 150 as shown with solid line 151 may be periodically repeated within the background current phase 110 (as shown with dashed line) until a next short between the molten metal ball 198 and the workpiece 199 occurs, at which time the arc 195 is extinguished and the current level of the waveform 100 is dropped below the background current level 111 to a current level 112, allowing the next molten ball 198 to wet into the puddle on the workpiece 199 (stage B). The heat-increasing current pulses 150 serve to re-heat the puddle and surrounding area to increase penetration. Such an increase in heat provided by the heat-increasing current pulses 150 may be desired in, for example, the welding of an open root joint in order to provide better penetration without increasing the fluidity of the puddle. The heat increasing pulses are not so large in amplitude as to transfer droplets across the arc and are not so wide in pulsewidth as to force the welding system above the short arc transition into globular transfer. Again, in general, the cycle 101 periodically repeats during the arc welding process to produce the resultant weld. However, the cycle 101 may repeat without the same number of heat increasing pulses 151 and possibly without the pinch current phase 120 if a short does not occur. As used herein, the term "current level" refers to a current amplitude which is substantially steady but may have some variations due to the somewhat in-exact nature of producing an electric welding waveform.

As an example, in accordance with an embodiment of the present invention, the arc welding process is a gas metal arc welding (GMAW) process using argon and carbon dioxide as shielding gases. The background current level 111 is about 70 amps, the peak current level 131 is about 330 amps, and the intermediate current level 151 is about 210 amps. The pulsewidth of a single heat-increasing pulse 150 is about 1 millisecond and may be repeated about every 3 milliseconds, up to three to six pulses during the background current phase 110. The period of the cycle 101 is about 15 milliseconds.

Figure 2:
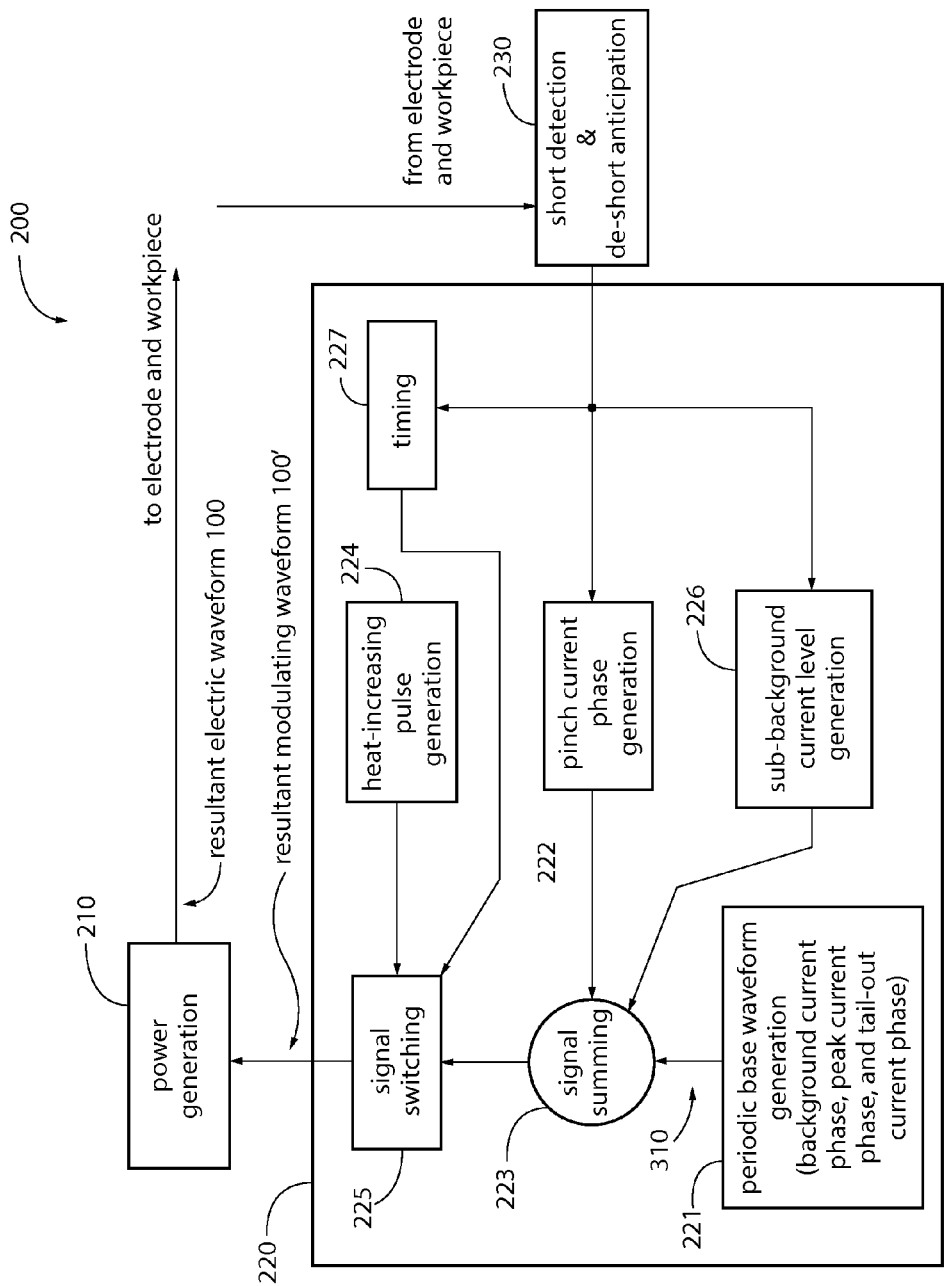
FIG. 2 illustrates a functional block diagram of a first exemplary embodiment of a system for generating the electric welding waveform of FIG. 1.

FIG. 2 illustrates a functional block diagram of a first exemplary embodiment of a system 200 for generating the electric welding waveform 100 of FIG. 1. The system 200 provides power generation capability 210 and modulating waveform generation and shaping capability 220 to create a modulating waveform 100'. The system 200 also provides short detection and premonition detection (de-short anticipation) capability 230 to detect when a short condition occurs between the electrode 191 and the workpiece 199 and to anticipate when a short condition is about to terminate (de-short condition) as a molten metal ball (e.g., 192) pinches off into the puddle on the workpiece 199.

Figure 3:
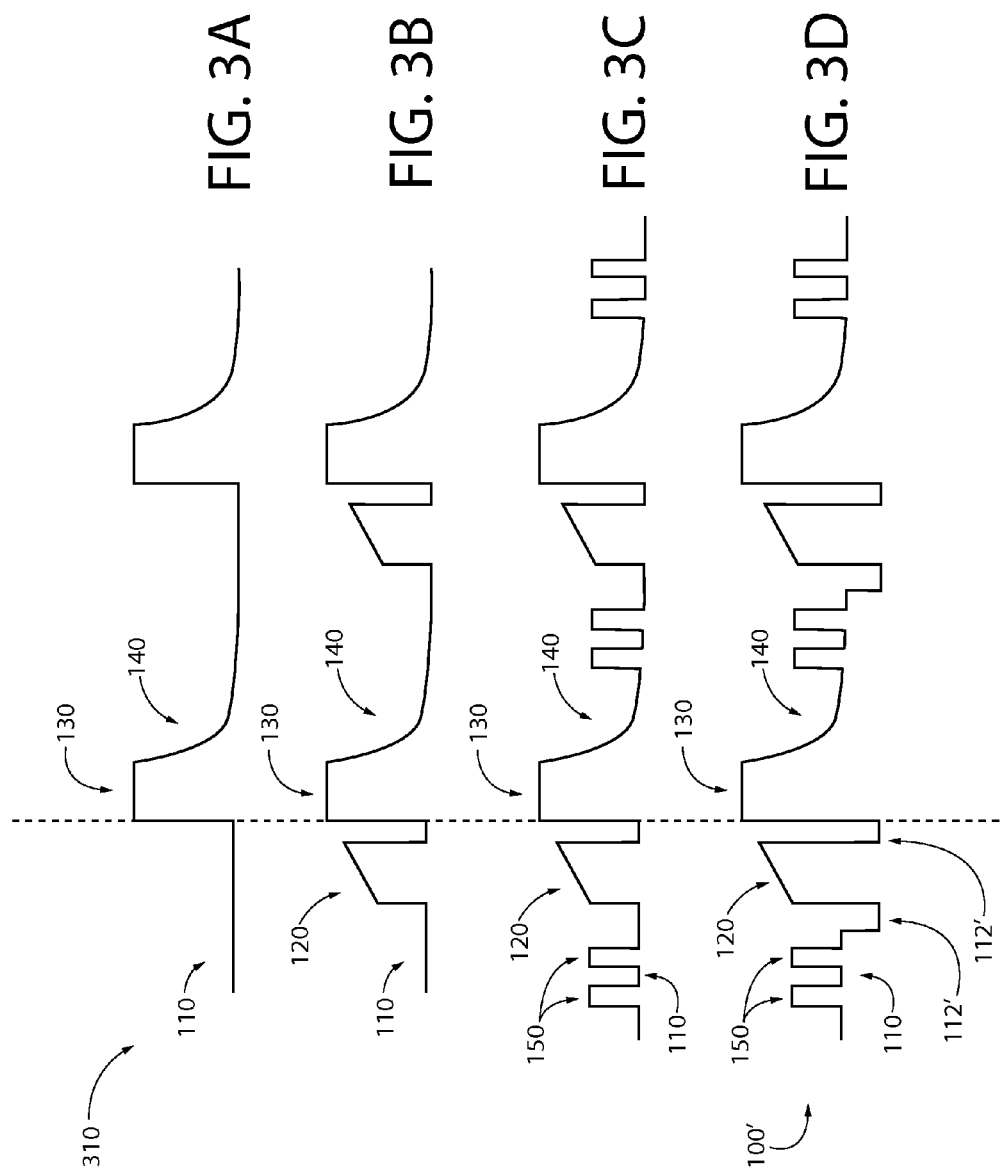
FIGS. 3A-3D illustrate exemplary embodiments of portions of a modulating waveform as generated by the various capabilities of the system of FIG. 2.

A modulating waveform 100' generated by the modulating waveform generation and shaping capability 220 is used to modulate the power generation capability 210 which provides electric current to the electrode 191 and workpiece 199 in the form of the electric welding waveform 100. The modulating waveform generation and shaping capability 220 includes a periodic base waveform generation capability 221. FIGS. 3A-3D illustrate exemplary embodiments of portions of the modulating waveform 100' as generated by the various capabilities of the system 200 of FIG. 2. FIG. 3A illustrates a periodic base waveform portion 310 generated by the periodic base waveform generation capability 221. The periodic base waveform generation capability 221 provides the generation of the background current phase 110, peak current phase 130, and tail-out current phase 140 of the modulating waveform 100' in a periodic manner.

The modulating waveform generation and shaping capability 220 also includes a pinch current phase generation capability 222. FIG. 3B illustrates the periodic base waveform portion 310 of FIG. 3A having the pinch current phase 120 added. In accordance with an embodiment of the present invention, the pinch current phase 120 may be summed with the periodic base waveform portion 310 using a signal summing capability 223 of the modulating waveform generation and shaping capability 220.

The modulating waveform generation and shaping capability 220 further includes a heat-increasing pulse generation capability 224. FIG. 3C illustrates the periodic base waveform portion 310 of FIG. 3A having the pinch current phase 120 of FIG. 3B and having the heat-increasing pulses 150 switched in during the background current phase 110. In accordance with an embodiment of the present invention, the heat-increasing current pulses 150 may be switched in during the background current phase 110 using a signal switching capability 225 of the modulating waveform generation and shaping capability 220.

The modulating waveform generation and shaping capability 220 also includes a sub-background current level generation (current reducing) capability 226. FIG. 3D illustrates the periodic base waveform portion 310 of FIG. 3A having the pinch current phase 120 of FIG. 3B, the background current phase 110 having the heat increasing current pulses 150 as shown in FIG. 3C, and having the sub-background current portions 112' added. In accordance with an embodiment of the present invention, the sub-background current portions 112' may be summed with the periodic base waveform portion 310 and the pinch current phase 120 using the signal summing capability 223 of the waveform generation and shaping capability 220.

The resultant modulating waveform 100' of FIG. 3D is used to modulate the power generation capability 210 to provide the actual current levels (111, 112, 121, 131, 141, 151) of the various portions of the electric welding waveform 100 to the electrode 191 and the workpiece 199 as shown in FIG. 1 and FIG. 2.

During a welding process using the system 200, the short detection and de-short anticipation capability 230 monitors current and voltage at the electrode 191 and the workpiece 199 and detects when a short condition occurs between the electrode 191 and the workpiece 199 and also anticipates when the short condition is about to terminate (de-short condition). When a short condition occurs, the sub-background current level capability 226 immediately pulls the current level of the waveform 100 below the background current level 110 to a current level 112, in response to the short condition being detected, allowing a molten metal ball to wet into a puddle on the workpiece 199 as described previously herein. Then the pinch current phase generation capability 222 applies the monotonically increasing pinch current level 121 to the waveform 100.

When a de-short condition is anticipated (i.e., the molten metal ball is about to pinch off from the distal end of the electrode), the sub-background current level capability 226 again pulls the current level of the waveform 100 below the background current level 110 to the current level 112, in response to the de-short condition being anticipated, in order to avoid splatter. Furthermore, a timing capability 227 of the waveform generation and shaping capability 220 is triggered. The timing capability 227 counts down over the time segments occupied by the peak current phase 130 and the tail-out current phase 140 until the waveform 100 reaches the background current phase 110.

In accordance with an embodiment of the present invention, the timing capability is pre-programmed with the amount of time occurring between the de-short condition and entrance into the background current phase 110. Once the timing capability 227 finishes counting down, indicating that the background current phase 110 has been entered, the signal switching capability 225 is triggered to switch in the heat-increasing pulses 150 from the heat-increasing pulse generation capability 224. The heat-increasing pulses 150 are switched into the waveform 100 during the background current phase 110 until a next short condition is detected.

The various functional capabilities of the system 200 of FIG. 2 may be implemented using configurations of electronic components which may include analog and/or digital electronic components. Such configurations of electronic components may include, for example, pulse generators, timers, counters, rectifiers, transistors, inverters, oscillators, switches, transformers, wave shapers, amplifiers, state machines, digital signal processors, microprocessors, and microcontrollers. Portions of such configurations may be programmable in order to provide flexibility in implementation. Various examples of such configurations of electronic components may be found in U.S. Pat. No. 4,972,064, U.S. Pat. No. 6,051,810, U.S. Pat. No. 6,498,321, and U.S. patent application Ser. No. 11/861,379, each of which is incorporated herein by reference in its entirety.

In accordance with an embodiment of the present invention, the system 200 includes a first configuration of electronic components to generate the background current phase 110, the peak current phase 130, and the tail-out current phase 140 of the electric welding waveform 100. The system 200 further includes a second configuration of electronic components to generate the pinch current phase 120 of the electric welding waveform 100. The system 200 also includes a third configuration of electronic components to generate at least one heat-increasing current pulse 150 of the electric welding waveform 100 during the background current phase 110.

In accordance with an embodiment of the present invention, the system 200 also includes a fourth configuration of electronic components to decrease the current level of the electric welding waveform 100 below the background current level at an end of the background current phase 110 in response to the electrode shorting to the workpiece. The system 200 further includes a fifth configuration of electronic components to decrease the current level of the electric welding waveform 100 below the background current level at an end of the pinch current phase 120 in anticipation of the electrode de-shorting from the workpiece.

The first through fifth configurations of electronic components may not necessarily be independent of each other but may share certain electronic components. For example, in accordance with an embodiment of the present invention, many of the electronic components of the first configuration may be the same as many of the electronic components of the third configuration. Similarly, many of the electronic components of the fourth configuration may be the same as many of the electronic components of the fifth configuration. Other shared components may be possible as well, in accordance with various embodiments of the present invention.

The functional implementation shown in FIG. 2 illustrates one exemplary embodiment. Other embodiments are possible as well. For example, in accordance with another embodiment, the pinch current phase 120 may be switched into the modulating waveform 100' via signal switching capability 225, instead of being summed in via signal summing capability 223. Similarly, the heat-increasing pulses 150 may be summed into the modulating waveform 100' via signal summing capability 223, instead of being switched in via signal switching capability 225. In accordance with another embodiment, the sub-background current level generation capability 226 may not be present, or may be optional, allowing generation of a modulating waveform that does not include the current level portions 112'. Other modified embodiments are possible as well, which result in generating the electric welding waveform 100 of FIG. 1 or similar waveforms having at least one heat-increasing current pulse during a background current phase.

Figure 4:
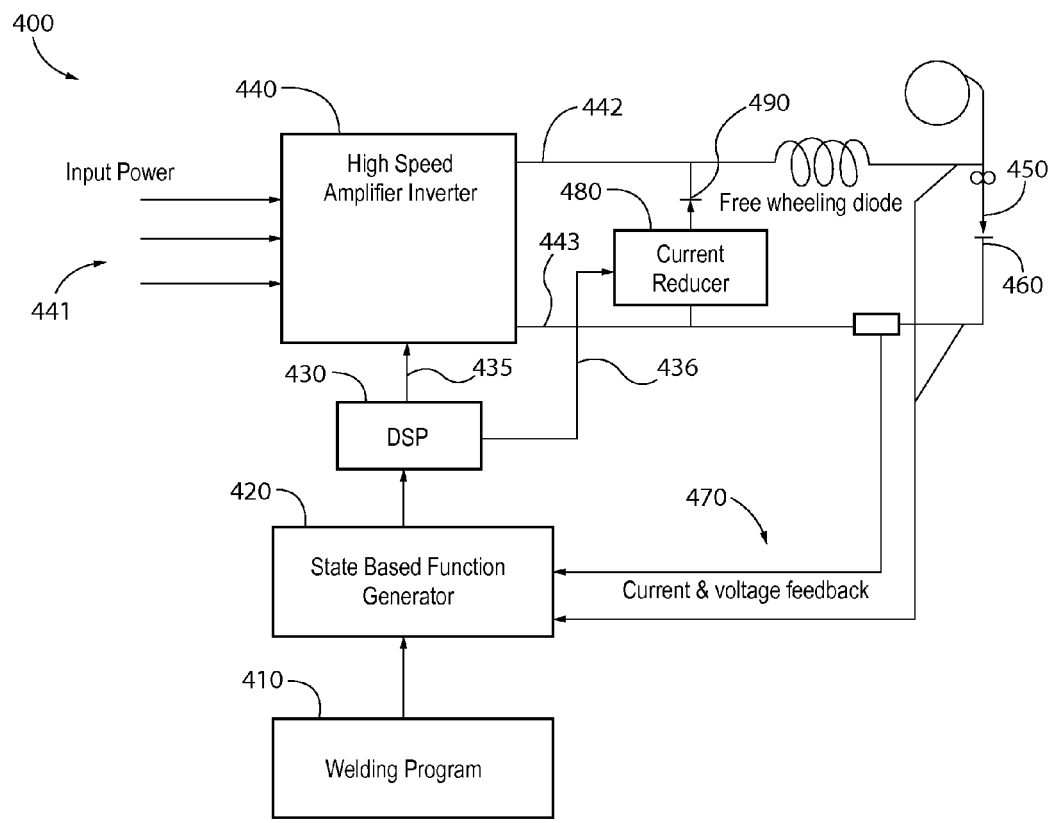
FIG. 4 illustrates a functional block diagram of a second exemplary embodiment of a system for generating the electric welding waveform of FIG. 1.

FIG. 4 illustrates a functional block diagram of a second exemplary embodiment of a system 400 for generating the electric welding waveform 100 of FIG. 1. The system 400 is a state machine type of system as is described herein. The Lincoln Electric Power Wave® 450 system is an example of a state machine type of welding system.

The system 400 includes a welding program 410 loaded onto a state based function generator 420. In accordance with an embodiment of the present invention, the state based function generator 420 includes a programmable microprocessor device. The welding program 410 includes the software instructions for generating an electric welding waveform. The system further includes a digital signal processor (DSP) 430 operationally interfacing to the state based function generator 420. The system also includes a high speed amplifier inverter 440 operationally interfacing to the DSP 430.

The DSP 430 takes its instructions from the state based function generator 420 and controls the high speed amplifier inverter 440. The high speed amplifier inverter 440 transforms a high voltage input power 441 into a low voltage welding output power in accordance with control signals 435 from the DSP 430. For example, in accordance with an embodiment of the present invention, the DSP 430 provides control signals 435 which determine a firing angle (timing of switch activation) for the high speed amplifier inverter 440 to produce various phases of an electric welding waveform.

The outputs 442 and 443 of the high speed amplifier inverter 440 are operationally connected to a welding electrode 450 and a workpiece 460 respectively to provide a welding current which forms an electric arc between the electrode 450 and the workpiece 460. The system 400 also includes voltage and current feedback capability 470 which senses a voltage between the electrode 450 and the workpiece 460 and which senses current flowing through the welding circuit formed by the electrode 450, the workpiece 460, and high speed amplifier inverter 440. The sensed current and voltage are used by the state based function generator 420 to detect shorting of the electrode 450 to the workpiece 460 (i.e., a short condition) and to detect when a molten metal ball is about to pinch off from the electrode 450 (i.e., a de-short condition).

The system 400 further includes a current reducer 480 and a diode 490. The current reducer 480 and the diode 490 are operationally connected between the outputs 442 and 443 of the high speed amplifier inverter 440. The current reducer 480 also operationally interfaces to the DSP 430. When a short condition occurs between the electrode 450 and the workpiece 460, the DSP 430 commands the current reducer 480, via a control signal 436, to pull the current level through the welding circuit below a predefined background current level. Similarly, when a de-short condition occurs (i.e., a molten metal ball pinches off from the distal end of the electrode 450) the DSP 430 commands the current reducer 480 to pull the current level through the welding circuit below a predefined background current level. In accordance with an embodiment of the present invention, the current reducer 480 includes a Darlington switch, a resistor, and a snubber.

Figure 5:
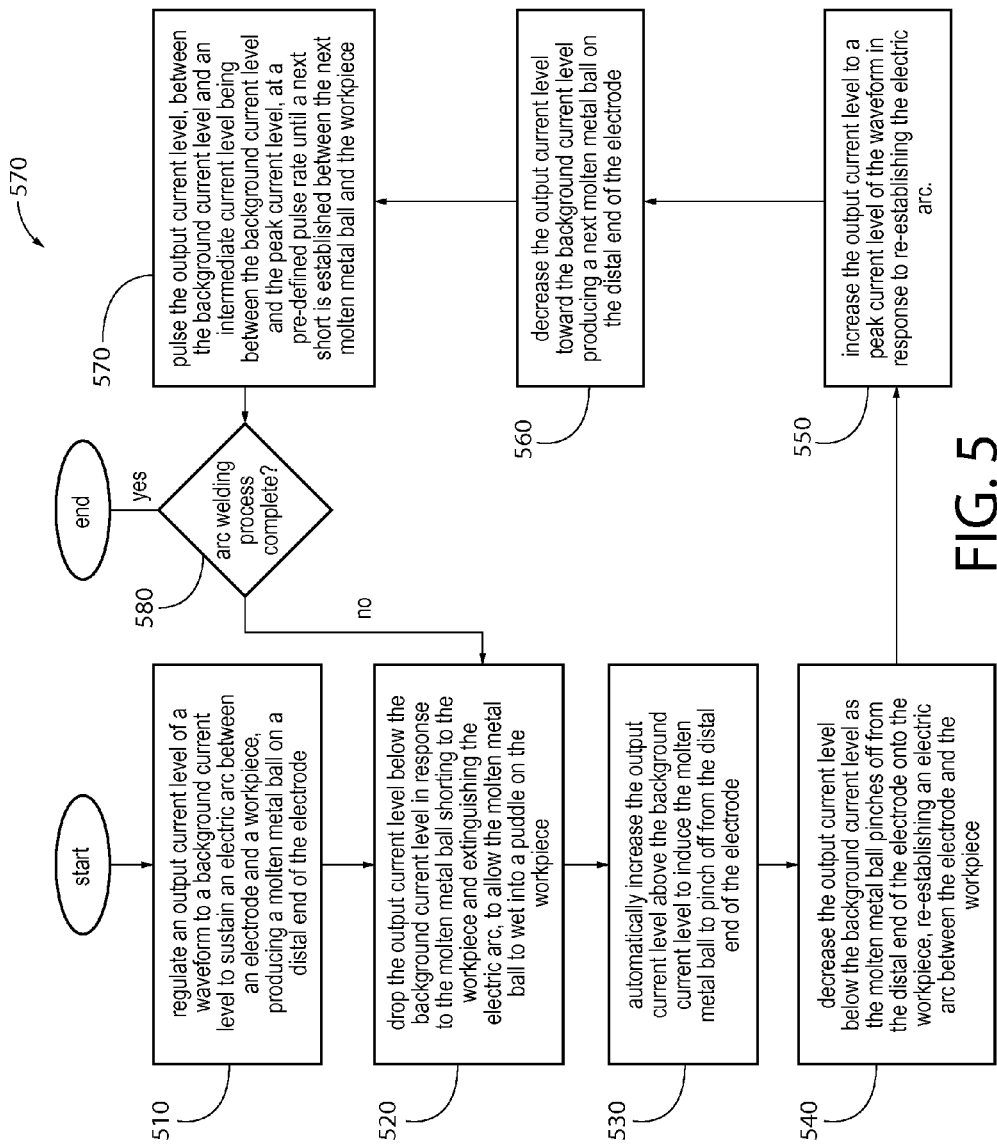
FIG. 5 illustrates a flowchart of a first exemplary embodiment of a method of increasing heat input to a weld during an arc welding process using the electric welding waveform of FIG. 1 and the system of FIG. 2 or the system of FIG. 4.

FIG. 5 illustrates a flowchart of a first exemplary embodiment of a method 500 of increasing heat input to a weld during an arc welding process using the electric welding waveform 100 of FIG. 1 and the system 200 of FIG. 2 or the system 400 of FIG. 4. In step 510, regulate an output current level of the waveform 100 to a background current level 111 to sustain an electric arc 195 between an electrode (e.g., 191 or 450) and a workpiece (e.g., 199 or 460), producing a molten metal ball 192 on a distal end of the electrode (e.g., 191 or 450). In step 520, drop the output current level below the background current level 111 in response to the molten metal ball 192 shorting to the workpiece (e.g., 199 or 460) and extinguishing the electric arc 195, to allow the molten metal ball 192 to wet into a puddle on the workpiece (e.g., 199 or 460). In step 530, automatically increase the output current level above the background current level 111 to induce the molten metal ball 192 to pinch off from the distal end of the electrode (e.g., 191 or 450).

In step 540, decrease the output current level below the background current level 111 as the molten metal ball 192 pinches off from the distal end of the electrode (e.g., 191 or 450) onto the workpiece (e.g., 199 or 460), re-establishing an electric arc 196 between the electrode (e.g., 191 or 450) and the workpiece (e.g., 199 or 460). In step 550, increase the output current level to a peak current level 131 of the waveform 100 in response to re-establishing an electric arc 196. In step 560, decrease the output current level toward the background current level 111, producing a next molten metal ball 198 on the distal end of the electrode (e.g., 191 or 450). In step 570, pulse the output current level, between the background current level 111 and an intermediate current level 151 being between the background current level 111 and the peak current level 131, at a pre-defined pulse rate until a next short is established between the next molten metal ball 198 and the workpiece (e.g., 199 or 460). In step 580, if the arc welding process is not completed, then proceed back to step 520, otherwise, end.

Figures 6A, 6B:
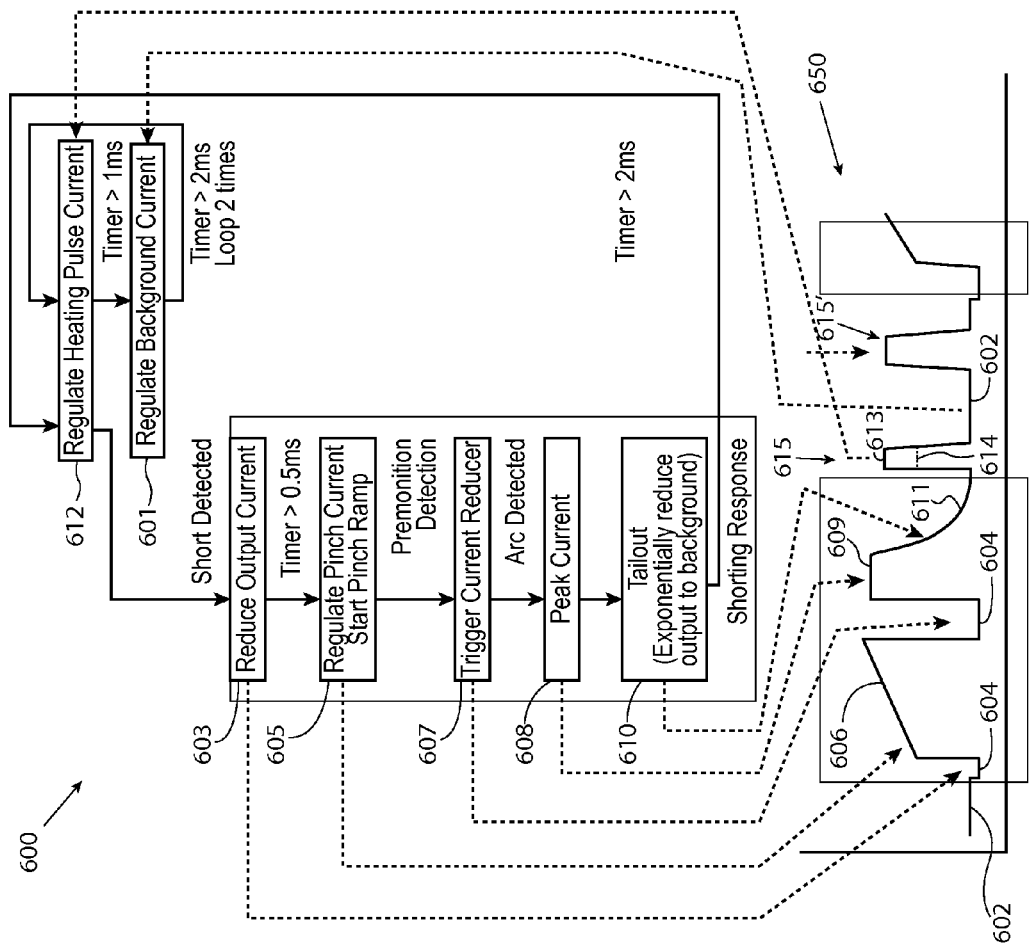
FIGS. 6A-6B illustrate a flowchart and resulting electric welding waveform of a second exemplary embodiment of a method of increasing heat input to a weld during an arc welding process using the system of FIG. 4.

FIGS. 6A-6B illustrate a flowchart and resulting electric welding waveform 650 of a second exemplary embodiment of a method 600 of increasing heat input to a weld during an arc welding process using the system 400 of FIG. 4. In step 601, regulate an output current level of an electric welding waveform 650 to a background current level 602. When a short condition is detected, then in step 603, reduce the output current level to a sub-level 604 being below the background current level 602 by triggering the current reducer 480. In step 605, start ramping the output current level according to a pinch current ramp 606. When a de-short condition (pinch off) is detected, then in step 607, reduce the output current level again to a sub-level 604 by triggering the current reducer 480.

In step 608, regulate the output current level to a peak current level 609 in response to re-establishing an arc between the electrode 450 and the workpiece 460. In step 610, decrease the output current level from the peak current level 609 toward the background current level 602 according to a monotonically decreasing tail-out current ramp 611. In step 612, regulate the output current level to a heat increasing current level 613 during a first pulse interval 614 forming a heat increasing current pulse 615.

The method 600 may alternate between step 601 and step 612 (i.e., the output current may switch back and forth between the heat increasing current level 613 and the background current level 602 forming subsequent heat increasing current pulses) for a pre-determined number of times, or until a next short condition is detected. Furthermore, in accordance with an embodiment of the present invention, the pulse width and amplitude of successive heat increasing current pulses 615' may be the same as or different from the pulse width and amplitude of the first heat increasing current pulse 615, depending on the specifics of the welding operation (e.g., weld metals, shielding gases, etc.).

Figure 7:
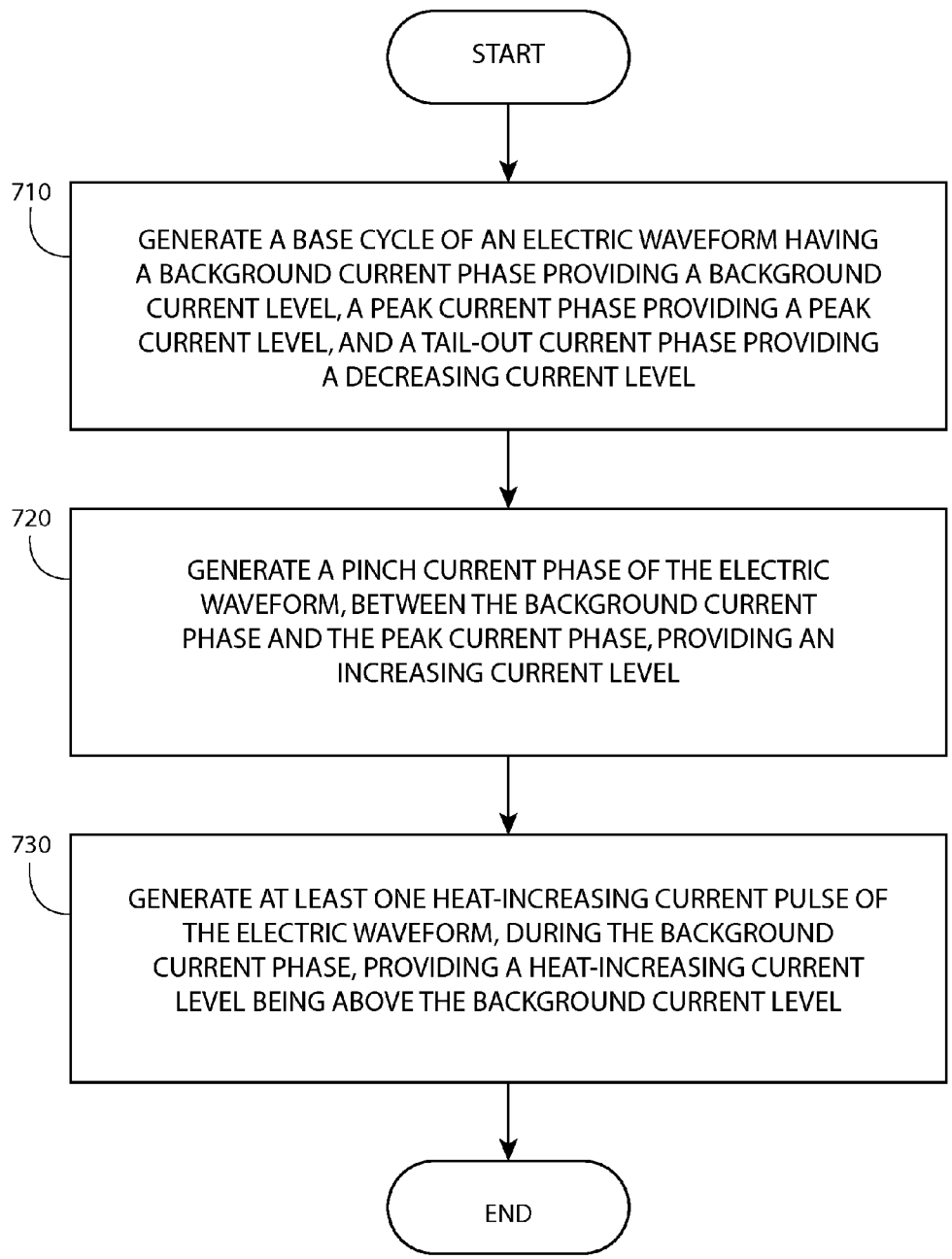
FIG. 7 illustrates a flowchart of a third exemplary embodiment of a method of increasing heat input to a weld during an arc welding process using the electric welding waveform of FIG. 1 or the electric welding waveform of FIG. 6 and the system of FIG. 2 or the system of FIG. 4.

FIG. 7 illustrates a flowchart of a third exemplary embodiment of a method 700 of increasing heat input to a weld during an arc welding process using the electric welding waveform 100 of FIG. 1 or the electric welding waveform 650 of FIG. 6B and the system 200 of FIG. 2 or the system 400 of FIG. 4. In step 710, generate a base cycle (e.g., 310) of an electric welding waveform (e.g., 100) having a background current phase (e.g., 110) providing a background current level (e.g., 111), a peak current phase (e.g., 130) providing a peak current level (e.g., 131), and a tail-out current phase (e.g., 140) providing a decreasing tail-out current level (e.g., 141). In step 720, generate a pinch current phase (e.g., 120) of the electric welding waveform (e.g., 100), between the background current phase (e.g., 110) and the peak current phase (e.g., 130), providing an increasing pinch current level (e.g., 121). In step 730, generate at least one heat-increasing current pulse (e.g., 150) of the electric welding waveform (e.g., 100), during the background current phase (e.g., 110), providing an intermediate current level (e.g., 151) being between the background current level (e.g., 111) and the peak current level (e.g., 131).

Figure 8:
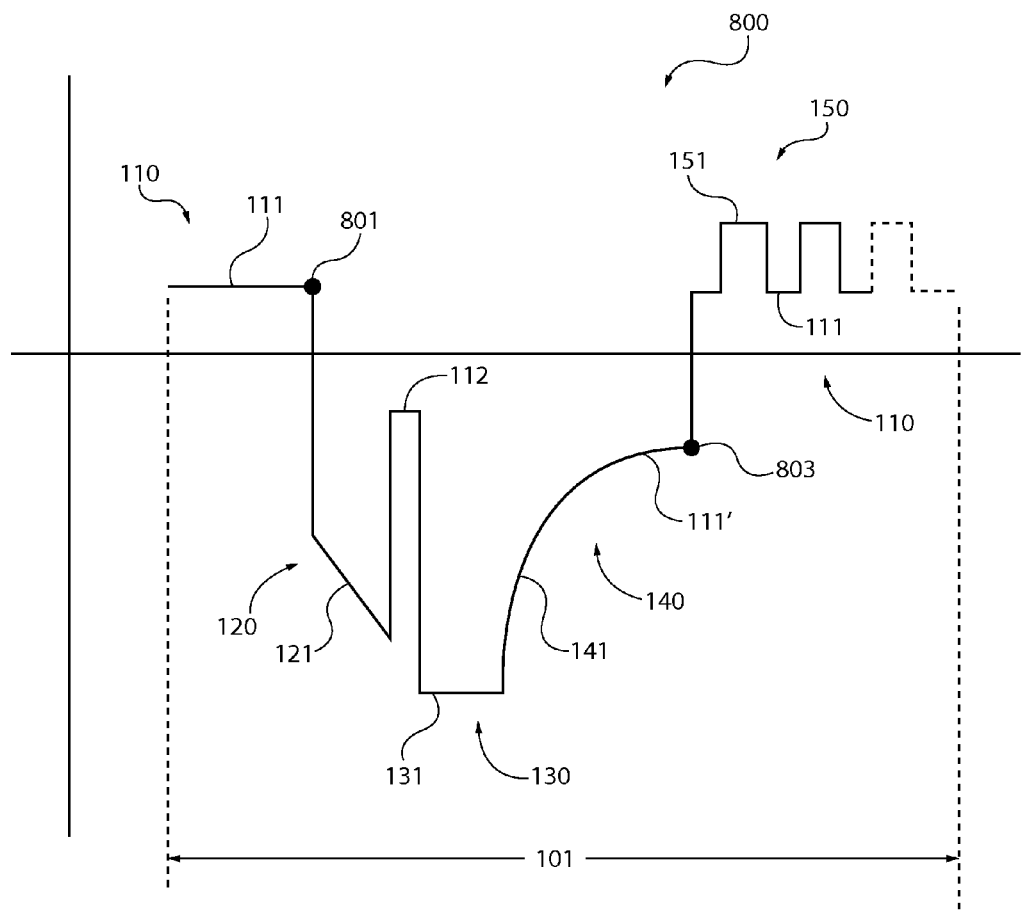
FIG. 8 illustrates an further exemplary embodiment of a cycle of an electric welding waveform used in an arc welding process to control heat input to a weld.

FIG. 8 depicts a further exemplary embodiment of the present invention. This embodiment is similar to that shown and discussed regarding FIGS. 1A-1B, except that in this embodiment the majority of the background current 111 and the heat increasing current pulses 150 have a first polarity, while the remainder the cycle 101 has an opposite polarity. In the embodiment shown in FIG. 8, the heat increasing pulses 150 and the majority of the background current 111 has a positive polarity while the remainder of the cycle 101 has a negative polarity. By using opposite polarities for these portions of the waveform the heat input into a weld can be further controlled. In the exemplary embodiment shown a relatively cool welding operation can be achieved. By having the bulk of the cycles 101 having a negative polarity, the welding operation can be colder than when the entirety of the cycle 101 is positive polarity. This is generally due to the direction of the current flow and more specifically is a result of reversing the anode and cathode of the welding process such that the "heat" of the welding arc changes from the puddle to the end of the wire. Thus, less current is required (either through a peak or plasma boost) to create a given droplet size. This can be very desirable depending on the welding operations being performed. However, it does remain desirable to be able to control the heat input into the weld and utilize the heat increasing current pulses 150 to input any desired or needed heat into the weld to control the weld puddle and penetration as desired.

In this exemplary embodiment, during welding when the shorting event occurs 801 (stage B in FIG. 1B), the welding power supply transitions the welding current from the first polarity (positive in FIG. 8) to the opposite polarity (negative in FIG. 8). It is generally easier for a welding power source to change polarity in a short circuit. This is because there is no need to re-establish an arc after the change in polarity, thus eliminating the explosive discharge required to establish an arc. In such an instance, the wire is already shorted and, as such, the power source can reduce current, change polarity and increase current as needed in a more controlled manner. After changing the polarity of the current, the pinch current phase 120, subsequent decrease to the lower current level 112, peak current phase 130 and tail-out current phase 140 are implemented similar to that described at length above. As the tail-out current phase 140 approaches or reaches a background current level 111' (at point 803), the power supply again switches polarity of the welding signal to the background level 111, and then implements the heat increasing current pulses 150 as generally described above.

In some exemplary embodiments, the transition point 803 occurs after the current reaches a background level 111'. In other exemplary embodiments, the transition point 803 can occur when the current approaches the background level 111'. In an exemplary embodiment of the present invention, the transition point 111' occurs when the current is within 10% of the background current 111' level. For example, if the background current level 111' is set at 50 amps, the transition point 803 will be in the range of 55 to 50 amps, as the current is decreasing. In further exemplary embodiments of the present invention, the transition point 803 occurs when the current, after the peak 131, is in the range of 50 to 75 amps. In other exemplary embodiments, a maximum current transition level is set such that the change in polarity will not occur unless the output current level is at or below the threshold level. In some exemplary embodiments, this threshold level is in the range of 75 to 100 amps. For example, if the threshold level is set at 80 amps the polarity of the waveform will not be changed until the output current is at or below 80 amps. Thus, the power supply will ramp down the current until this threshold is reached and then initiate the polarity switch. It may be the case, during some welding operations, that a background current level is higher than the above threshold value. When that is the case the current is reduced until it reaches or falls below the threshold value and then the polarity is switched. Following the switch the current level goes to the desired level.

Further, in exemplary embodiments the background current 111' and the background current 111 can have the same absolute value magnitude (with opposite polarity), while in other embodiments the magnitudes can be different. In exemplary embodiments of the present invention, the background current 111 (used with the heat increasing current pulses 150) is in the range of 50 to 75 amps—having an opposite polarity of the background 111'.

Thus, either during, or prior to, welding the current waveforms of the present invention can be used to increase or manage heat input into the weld to increase penetration or wetting of the weld joint. As described previously, the heat increasing current pulses 150 can be modified or implemented in a number of ways to increase the heat input into the weld. That is, the frequency, peak current, pulsewidth, and/or quantity of pulses 150 can be modified to provide the desired amount of heat input. Additionally, it is not necessary that the pulses 150 have the same pulsewidth or peak current magnitude in any one series of pulses. In some exemplary embodiments, the peak current 151 and/or pulsewidth of the subsequent pulses 150 within a given series (or within a given cycle 101) can be decreasing. For example, if a series of 4 pulses 150 are used in a cycle 101, each subsequent pulse will have a lower current peak 151 than the preceding pulse. In other embodiments, the current and/or pulsewidth can be increasing.

As described previously, the pulses 150 are not used to transfer droplets from the welding electrode to the weld puddle, but instead are used to increase the heat input into the weld puddle as needed. In exemplary embodiments of the present invention, the pulses 150 have a peak current level 151 higher than the background level, and in some embodiments is in the range of 50 to 250 amps. In other exemplary embodiments, the peak current level 151 of the pulses 150 is in the range of 100 to 250 amps. The pulsewidth of a single pulse 150 is in the range of 0.5 to 2 ms. In most embodiments, the pulsewidth of the single pulse 50 is less than the pulsewidth of the droplet transfer function/pulse. Of course, embodiments of the present invention are not limited to these ranges as other values can be utilized without departing from the spirit or scope of the present invention. However, in most exemplary embodiments the peak current level 151 of the pulses 150 will be less than the peak current of the waveform (e.g., 131) and the background level.

These embodiments of the present invention can be implemented using similar welding power supplies and equipment as described herein, and using similar control methodology, and as such repetition of this description is not necessary. Of course, the equipment/power supply utilized must be capable of generating a welding signal that rapidly changes between polarities, as shown in FIG. 8. For example, a power supply such as the Power Wave®, manufactured by The Lincoln Electric Company, of Cleveland, Ohio is capable of such welding.

In additional exemplary embodiments of the present invention, a welding waveform 100 can be utilized which is made up of a combination of cycles as shown in FIG. 1A and FIG. 8. That is, the waveform 100 can have a combination of cycles 101 in which the entire cycle has a same polarity and cycles 101 as described with regard to FIG. 8. Such embodiments provide additional heat input modulation capabilities. For example, a waveform 100 can be utilized which has a plurality of cycles 101, as shown in FIG. 1A, followed by a plurality of cycles as shown in FIG. 8. In embodiments of the invention, the number of respective cycles in the waveform 100 can be varied to maximize heat input control. That is, it is not necessary that the respective numbers of cycles 101 of each type be the same.

In yet a further exemplary embodiment of the present invention, the cycles 101 in the waveform 100 can "flip polarities". That is, the waveform 100 can comprise a plurality of cycles 101 which look like the cycle 101 in FIG. 8, and comprise a plurality of cycles 101 which are the mirror image of FIG. 8—where the pulses 150 and background 111 have a negative polarity, and the remainder of the cycle 101 has a positive polarity.

The above flexibility allows welding waveforms to be created which precisely manage and control heat input into a weld. Furthermore, embodiments of the present invention, allow a user to carefully control and manage heat input into a weld, using a versatile welding waveform. Furthermore, as with the embodiments described in FIGS. 1A and 3A to 3D, embodiments of the present invention are not limited to the use of pulses 130 like that shown in these figures and various other types of pulse welding waveforms which use a background portion in the waveform.

In summary, a method and a system to increase, control and manage heat input to a weld during an arc welding process is disclosed. A series of electric arc pulses are generated between an advancing welding electrode and a metal workpiece using an electric arc welding system capable of generating an electric welding waveform to produce the electric arc pulses. A cycle of the electric welding waveform includes a pinch current phase providing an increasing pinch current level, a peak current phase providing a peak current level, a tail-out current phase providing a decreasing tail-out current level, and a background current phase providing a background current level. At least one heat-increasing current pulse of the cycle is generated, providing a heat-increasing current level, during the background current phase, where the heat-increasing current level is above the background current level. The cycle of the electric welding waveform with the at least one heat-increasing current pulse may be repeated until the arc welding process is completed. The heat-increasing current pulses serve to re-heat the puddle and surrounding area to increase penetration. Such an increase in heat provided by the heat-increasing current pulses may be desired in, for example, the welding of an open root joint in order to provide better penetration without increasing the fluidity of the puddle. The heat increasing pulses are not so large in amplitude as to transfer droplets across the arc and are not so wide in pulsewidth as to force the welding system above the short arc transition into globular transfer. In further exemplary embodiments, the heat increasing pulses have an opposite polarity than the pinch, peak and tail-out current polarities.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

Figure 9:
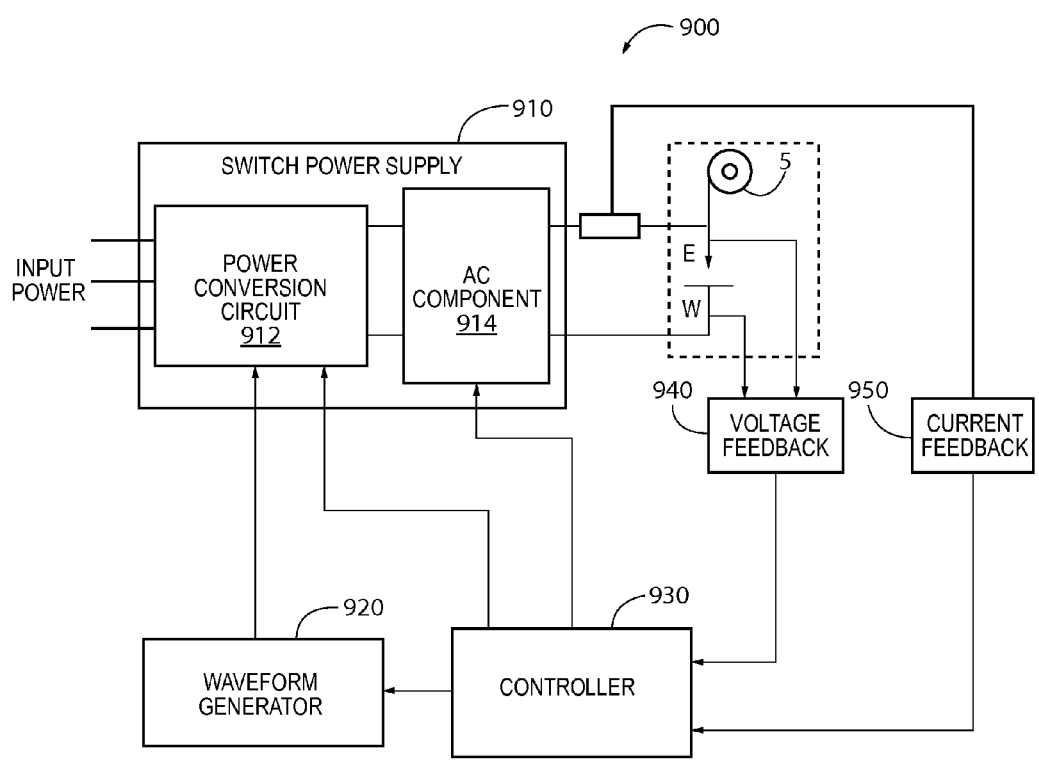
FIG. 9 is a block diagram illustrating a welder system that facilitates generating an electric welding waveform with one or more portions in a negative polarity of current.

Referring now to additional drawings, wherein the showings are for the purpose of illustrating an exemplary embodiment of the invention only and not for the purpose of limiting same, FIG. 9 illustrates a schematic block diagram of welding system 900 operatively connected to consumable welding electrode E and workpiece W. Welding system 900 includes switch power supply 910 that provides power to welding system 900 in which the power supplied can include current that is positive polarity, negative polarity, alternating current (AC), direct current (DC), or two or more thereof with switching therebetween. Switch power supply 910 includes power conversion circuit 912 providing welding output power between welding electrode E and the workpiece W. Power conversion circuit 912 may be transformer based with a half bridge output topology. For example, power conversion circuit 912 may be of an inverter type that includes an input power side and an output power side, for example, as delineated by the primary and secondary sides, respectively, of a welding transformer. Other types of power conversion circuits are possible as well such as, for example, a chopper type having a DC output topology. Wire feeder 5 feeds consumable wire welding electrode E toward workpiece W. Wire feeder 5, consumable welding electrode E, and workpiece W are not part of welding system 900 but may be operatively connected to welding system 100 via a welding output cable (not shown).

Welding system 900 also includes AC component 914. AC component 914 provides AC current to welding system 900. AC component 914 can be, for instance, a hybrid bridge circuit having a main bridge circuit and an auxiliary bridge circuit, wherein the main bridge circuit is operatively connected to power conversion circuit 912 and is configured to switch a direction of the output current through a low impedance welding output circuit path (including electrode E and workpiece W) operatively connected to a welding output of welding system 900 at the command of controller 930.

Welding system 900 further includes waveform generator 920 and controller 930. Waveform generator 920 generates welding waveforms at the command of controller 930. A waveform generated by waveform generator 920 modulates the output of power conversion circuit 912 to produce the welding output current between electrode E and workpiece W.

Welding system 900 may further include voltage feedback circuit 940 and current feedback circuit 950 to monitor the welding output voltage and current between electrode E and workpiece W and provide the monitored voltage and current back to controller 930. The feedback voltage and current may be used by controller 930 to make decisions with respect to modifying the welding waveform generated by waveform generator 920 and/or to make other decisions that affect safe operation of the welding system 900, for example.

It is to be appreciated that welding system 900 can utilize a measured parameter of the welding process in order to adjust a portion of a welding waveform generated by waveform generator 920. In an embodiment, the measure parameter can be a derivative of a welding parameter over time during the welding process such as, but not limited to, a derivative of current reading, a derivative of voltage reading, a derivative of resistance reading, a derivative of power, among others. Moreover, the derivative of the welding parameter can be detected in real time. In an embodiment, the derivative of a welding parameter can be a trigger for a change in a welding process, a waveform, a portion of a waveform, a combination thereof, among others.

As referenced above, welding system 900 implements a negative polarity current (via a waveform) to produce the welding output current between electrode E and workpiece W. The employment of a portion of a waveform having a negative polarity provides various benefits and advantages to a welding system and/or welding process. The negative polarity of the waveform provides a colder arc welding process since the current amplitude used in the negative polarity for an event (e.g., peak current phase, short clearing ramp phase, tail-out current phase, etc.) is less than the current amplitude required in the positive polarity for such event. Moreover, the negative polarity of the waveform allows for the molten ball to create quicker in comparison to a positive polarity of waveform. For instance, the negative polarity heats electrode 260 rather than the puddle, wherein a positive polarity typically heats the puddle. Moreover, the negative polarity for the waveform provides less puddle depression in comparison to use of positive polarity within GMAW processes. In an embodiment, surface tension transfer (STT) can employ a portion of a negative polarity current via a waveform. It is to be appreciated and understood that the negative portion of a waveform can be utilized with welding process such as, but not limited to, a surface tension transfer (STT) welding process, a GMAW process, an arc welding process, among others.

Moreover, it is to be appreciated that the subject innovation references an increase with a negative current and a decrease with a negative current, wherein an increase with a negative current level (e.g., within a negative polarity) refers to the negative current level approaching zero current level or a positive current level and a decrease with a negative current level (e.g., within a negative polarity) refers to the negative current level retreating from the zero current level or a positive current level. For instance, for the purpose of this subject innovation, an increase of 1 unit to a −5 current level would be to −4 current level (e.g., the negative current level approaching zero current level) and a decrease of 1 unit to a −5 current level would be to −6 current level (e.g., the negative current level retreating (away) from the zero current level).

Figure 10:
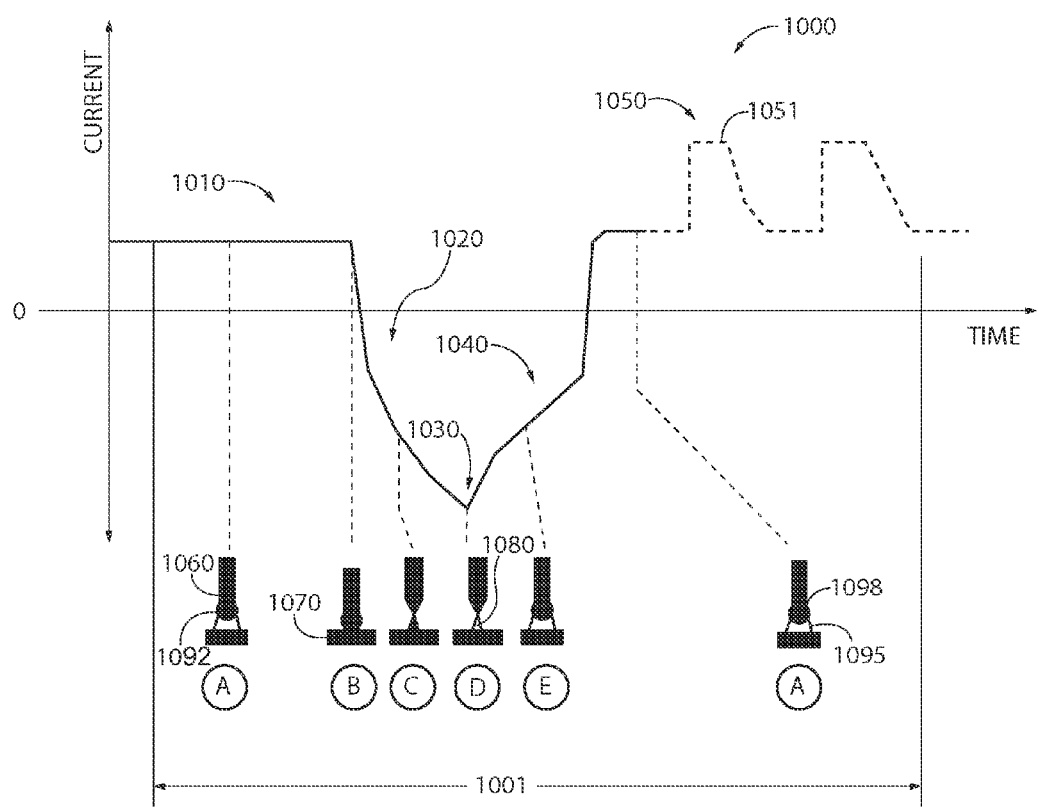
FIG. 10 is a block diagram illustrating an embodiment of a cycle of an electric welding waveform with one or more portions in a negative polarity of current used in an arc welding process.

FIG. 10 illustrates welding output current waveform 1000. Waveform 1000 includes background current phase 1010, short clearing ramp phase 1020, peak current phase 1030, and tail-out current phase 1040. During background current section 1010, an output current level of waveform 1000 is regulated to a positive polarity background current level. During short clearing ramp phase 1020, the output current level of waveform 1000 is decreased (e.g., dropped) into a negative polarity which reduces the output current level below the positive polarity background current level as well as zero (0). During peak current phase 1030, the output current level is decreased away from the positive polarity background current level further into the negative polarity to a negative peak current level, wherein the negative peak current level is a most negative current level with waveform 1000. During tail-out current phase 1040, the output current is increased toward the positive polarity background current level.

During a welding operation using waveform 1000, during stage A as illustrated in FIG. 10 (i.e., during background current phase 1010), molten metal ball 1092 is produced at the end of consumable welding electrode 1060. During stage B as illustrated in FIG. 10 (i.e., during short clearing ramp phase 1020), molten metal ball 1092 shorts to workpiece 1070 and the current is reduced toward zero and a negative polarity of current below zero, allowing molten metal ball 1092 to wet into a puddle on workpiece 1070. During stage C as illustrated in FIG. 10 (i.e., during short clearing ramp phase 1020), a ramped (e.g., with a negative slope) current is applied to the short to help molten metal ball 1092 pinch off from the end of electrode 1060 into the puddle on workpiece 1070. During stage D as illustrated in FIG. 10 (i.e., during peak current phase 1030), the current is reduced (more negative and away from the positive polarity background current level) to a negative peak current level, allowing welding arc 1080 to easily re-establish between electrode 1060 and workpiece 1070 after molten metal ball 1092 has pinched off from electrode 1060, clearing the short. During stage E as illustrated in FIG. 10 (i.e., during tail-out current phase 1040), the current is increased (toward the positive polarity background current level) producing a next molten metal ball 1098 on the distal end of electrode 1060. During tail-out current phase 1040, generated heat is controlled by controlling the rate at which the current transitions from a peak current level to a background current level. The waveform repeats during the welding process to form a weld.

After tail-out current phase 1040, the background current phase 1010 is again entered, providing the background current level and producing a substantially uniform next molten metal ball 1098 at the distal end of the electrode 1060 (stage A). After a background current phase 1010 (e.g., after a first cycle of waveform 1000 and after tail-out current phase 1040), at least one heat-increasing current pulse 1050 is generated, providing an intermediate current level 1051 that is greater than the positive background current level and less than an absolute value of the negative peak current level. Heat increasing current pulse 1050 may be periodically repeated within background current phase 1010 until a next short between molten metal ball 1098 and workpiece 1070 occurs, at which time the arc 1095 is extinguished and the current level of the waveform 1000 is dropped below the background current level into a negative polarity (e.g., below zero (0)) allowing the next molten ball 1098 to wet into the puddle on the workpiece 1070 (stage B).

Heat-increasing current pulses 1050 serve to re-heat the puddle and surrounding area to increase penetration. Such an increase in heat provided by heat-increasing current pulses 1050 may be desired in, for example, the welding of an open root joint in order to provide better penetration without increasing the fluidity of the puddle. The heat-increasing pulses are not so large in amplitude as to transfer droplets across the arc and are not so wide in pulse-width as to force the welding system above the short arc transition into globular transfer. Again, in general, cycle 1001 periodically repeats during the arc welding process to produce the resultant weld. However, the cycle 1001 may repeat without the same number of heat-increasing current pulses 1050 and possibly without short clearing ramp phase 1020 if a short does not occur. As used herein, the term "current level" refers to a current amplitude which is substantially steady but may have some variations due to the somewhat inexact nature of producing an electric welding waveform. Although heat-increasing current pulse 1050 is illustrated in a positive polarity, it is to be appreciated that the polarity of heat-increasing current pulse 1050 can include a positive portion, a negative portion, or switching between a positive portion and a negative portion. Additionally, it is to be appreciated that heat-increasing current pulse 1050 can include a width (e.g., duration) that is adjustable based on a setting (e.g., dynamically adjusted, user-defined, pre-defined, a combination thereof, among others). In an embodiment, the width (e.g., duration of the pulse) of each heat-increasing current pulse 1050 can vary based on a wire feed speed. For instance, as a wire feed speed increases, a width (e.g., duration of time) of heat-increasing current pulse 1050 can increase.

Figure 11:
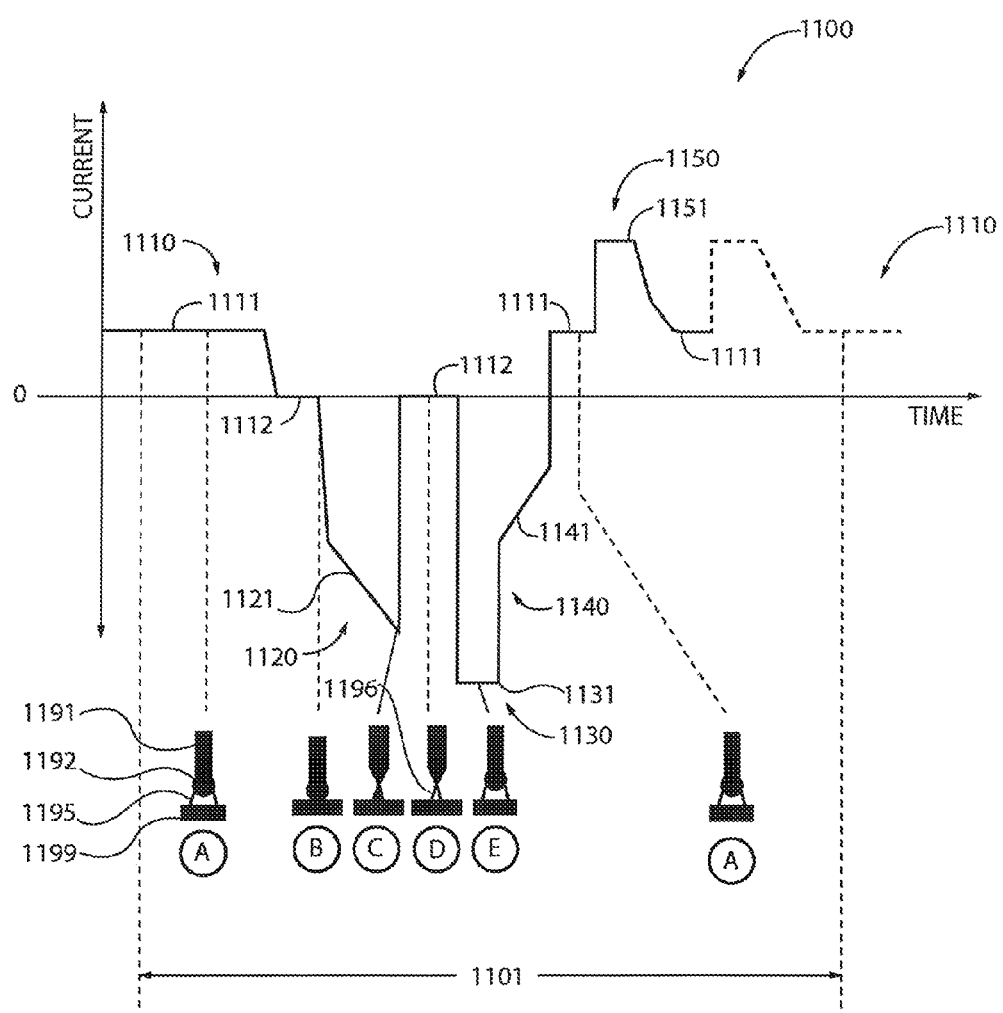
FIG. 11 is a block diagram illustrating an embodiment of a cycle of an electric welding waveform with one or more portions in a negative polarity of current used in an arc welding process.

FIG. 11 illustrates welding output current waveform 1100. Waveform 1100 is designed for use in a short circuit transfer welding process known as a surface tension transfer (STT) process. FIG. 11 illustrates cycle 1101 of electric welding waveform 1100 used in an arc welding process. FIG. 11 further illustrates various stages (A through E) of the arc welding process over cycle 1101 using electric welding waveform 1100, showing the relationship between welding electrode 1191 and metal workpiece 1199. During an arc welding process, a series of electric arc pulses are generated between advancing electrode 1191 and metal workpiece 1199 using an electric arc welding system capable of generating electric welding waveform 1100 to produce the electric arc pulses. In general, cycle 1101 periodically repeats during the arc welding process to produce the resultant weld. However, cycle 1101 may repeat without the same number of heat increasing pulses 1150 and possibly without pinch current phase 1120 if a short condition does not occur.

Cycle 1101 of electric welding waveform 1100 includes background current phase 1110 providing positive polarity background current level 1111, pinch current phase 1120 providing monotonically decreasing pinch current level 1121 (away from the positive polarity background current level), peak current phase 1130 providing negative peak current level 1131, and tail-out current phase 1140 providing monotonically increasing tail-out current level 1141 (toward the positive polarity background current level).

During background current phase 1110, electric arc 1195 is sustained between electrode 1191 and workpiece 1199 producing molten metal ball 1192 on a distal end of electrode 1191 (see stage A). At stage B, molten metal ball 1192, still connected to electrode 1191, shorts to workpiece 1199. When the short occurs, arc 1195 is extinguished and the current level of waveform 1100 is dropped below positive polarity background current level 1111 to current level 1112, allowing molten ball 1192 to wet into a puddle on workpiece 1199.

During pinch current phase 1120, the current level of waveform 1100 is decreased monotonically (e.g., ramped with a negative slope) below positive polarity background current level 1111 into a negative polarity, providing negative pinch current level 1121 which causes the shorted molten metal ball 1192 to begin to pinch off from the distal end of electrode 1191 into the puddle of workpiece 1199 as shown in stage C. As molten metal ball 1192 is about to pinch off from electrode 1191, the current level of waveform 1100 is increased toward positive polarity background current level 1111 to current level 1112 to avoid spatter, and arc 1196 is re-established between electrode 1191 and workpiece 1199.

Once arc 1196 is re-established, waveform 1100 enters peak current phase 1130. During peak current phase 1130, the current level of waveform 1100 is decreased (away from positive polarity background current 1111) to and held at negative peak current level 1131. In accordance with an embodiment, the absolute value of negative peak current level 1131 is the highest current level of waveform 1100 and establishes arc 1197 between electrode 1191 and workpiece 1199 of sufficient strength to begin forming next molten metal ball 1198 at the distal end of electrode 1191.

After peak current phase 1130, waveform 1100 enters tail-out current phase 1140. During tail-out current phase 1140, the current level of waveform 1100 monotonically (e.g., exponentially) increases toward positive polarity background current level 1111 providing increasing tail-out current level 1141. The current of waveform 1100 inputs heat into the weld. Tail-out current phase 1140 acts as a coarse heat control phase for waveform 1100 whereas background current phase 1110 acts as a fine heat control phase for waveform 1100. However, in certain arc welding applications, it may be desirable to provide additional heat input control.

After tail-out current phase 1140, background current phase 1110 is again entered, providing positive polarity background current level 1111 and producing a substantially uniform next molten metal ball 1198 at the distal end of electrode 1191 (second stage A). During background current phase 1110, at least one heat-increasing current pulse 1150 is generated, providing intermediate current level 1151 that is greater than positive polarity background current level 1111 and less than an absolute value of negative peak current level 1131. Heat increasing current pulse 1150 as shown with the solid line may be periodically repeated as shown with dashed line within background current phase 1110 until a next short between molten metal ball 1198 and workpiece 1199 occurs, at which time arc 1195 is extinguished and the current level of waveform 1100 is dropped below positive polarity background current level 1111 to current level 1112, allowing next molten ball 1198 to wet into the puddle on workpiece 1199 (stage B).

Heat-increasing current pulses 1150 serve to re-heat the puddle and surrounding area to increase penetration. Such an increase in heat provided by heat-increasing current pulses 1150 may be desired in, for example, the welding of an open root joint in order to provide better penetration without increasing the fluidity of the puddle. The heat increasing pulses are not so large in amplitude as to transfer droplets across the arc and are not so wide in pulsewidth as to force the welding system above the short arc transition into globular transfer. Again, in general, cycle 1101 periodically repeats during the arc welding process to produce the resultant weld. However, cycle 1101 may repeat without the same number of heat increasing pulses 1151 and possibly without pinch current phase 1120 if a short does not occur. As used herein, the term "current level" refers to a current amplitude which is substantially steady but may have some variations due to the somewhat in-exact nature of producing an electric welding waveform. Although current pulse 1150 is illustrated in a positive polarity, it is to be appreciated that the polarity of current pulse 1150 can include a positive portion, a negative portion, or switching between a positive portion and a negative portion. Additionally, it is to be appreciated that current pulse 1150 can include a width (e.g., duration, duration of time) that is adjustable based on a setting (e.g., dynamically adjusted, user-defined, pre-defined, a combination thereof, among others). In an embodiment, the width (e.g., duration) of each current pulse 1150 can vary based on a wire feed speed. For instance, as a wire feed speed increases, a width (e.g., duration of time) of current pulse 1150 can increase.

Figure 12:
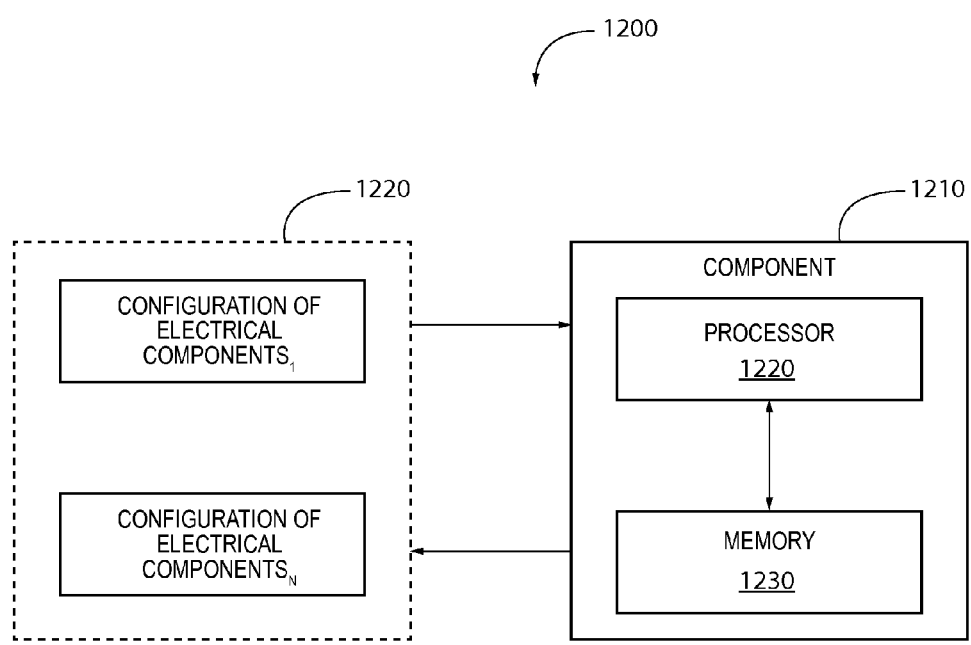
FIG. 12 is a block diagram illustrating one or more components that facilitate utilizing a negative polarity portion of a current waveform to control an arc welding process.

FIG. 12 illustrates system 1200 that is configured to generate waveforms in accordance with at least one of waveform 1000 (of FIG. 10) or waveform 1100 (of FIG. 11). The various functional capabilities of system 900 of FIG. 9 that utilizes waveforms 1000 and/or 1100 of FIGS. 10 and 11 respectively can be implemented using configurations of electronic components which may include analog and/or digital electronic components. A component can be, but is not limited to, a portion of software, a portion of hardware, or a combination thereof. System 1200 includes at least one component 1210, wherein component 1210 includes processor 1220 coupled to memory 1230. Memory 1230 stores at least one instruction that can be executed by processor 1220. Such configurations of electronic components may include, for example, pulse generators, timers, counters, rectifiers, transistors, inverters, oscillators, switches, transformers, wave shapers, amplifiers, state machines, digital signal processors, microprocessors, and microcontrollers. Portions of such configurations may be programmable in order to provide flexibility in implementation.

In accordance with an embodiment of the present invention, system 1200 include a suitable number of configuration of electrical components such as, but not limited to, configuration of electrical components, to configuration of electrical components$_N$, where N is a positive integer. In an embodiment, system includes a first configuration of electronic components that generate a background current phase, a peak current phase, and a tail-out current phase of the electric welding waveform, wherein the background current phase provides a positive background current level, the peak current phase provides a negative peak current level, and the tail-out current phase provides a monotonically increasing tail-out current level toward the positive background current level. In an embodiment, system 1200 includes a second configuration of electronic components that generate a short clearing ramp phase of the electric welding waveform, wherein the short clearing ramp phase provides a decreasing current level in a positive polarity of current for the electric welding waveform.

In an embodiment, system 1200 includes a third configuration of electronic components that generate at least one heat-increasing current pulse of the electric welding waveform during the background current phase, wherein the at least one heat-increasing current pulse is at an intermediate current level that is greater than the positive background current level and less than an absolute value of the negative peak current level. In an embodiment, system 1200 includes a fourth configuration of electronic components that increase a current level of the electric welding waveform toward the positive background current level at an end of the background current phase in response to the electrode shorting to said workpiece. In an embodiment, system 1200 includes a fifth configuration of electronic components that increase a current level of said electric welding waveform toward the positive background current level at an end of the short clearing ramp phase in anticipation of the electrode de-shorting from said workpiece. In an embodiment, system 1200 includes a sixth configuration of electronic components to periodically re-generate the background current phase, the short clearing ramp phase, the peak current phase, and the tail-out current phase in succession such that the background current phase includes said at least one heat-increasing current pulse.

In one embodiment, component 1210 is a computer operable to execute the disclosed methodologies and processes, including methods 1300 and 1400 described herein. In order to provide additional context for various aspects of the present invention, the following discussion is intended to provide a brief, general description of a suitable computing environment in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and/or software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices. For instance, a remote database, a local database, a cloud-computing platform, a cloud database, or a combination thereof can be utilized with component 1210.

The component 1210 can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within component 1210, such as during start-up, is stored in the ROM.

Component 1210 can further include a hard disk drive, a magnetic disk drive, e.g., to read from or write to a removable disk, and an optical disk drive, e.g., for reading a CD-ROM disk or to read from or write to other optical media. Component 1210 can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by component 1210.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, Radio Frequency (RF), Near Field Communications (NFC), Radio Frequency Identification (RFID), infrared, and/or other wireless media. Combinations of any of the above should also be included within the scope of computer readable media.

A number of program modules may be stored in the drives and RAM, including an operating system, one or more application programs, other program modules, and program data. The operating system in component 1210 can be any of a number of commercially available operating systems.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Alternatively or in addition, a local or cloud (e.g., local, cloud, remote, among others) computing platform can be utilized for data aggregation, processing, and delivery. For this purpose, the cloud computing platform can include a plurality of processors, memory, and servers in a particular remote location. Under a software-as-a-service (SaaS) paradigm, a single application is employed by a plurality of users to access data resident in the cloud. In this manner, processing requirements at a local level are mitigated as data processing is generally done in the cloud, thereby relieving user network resources. The software-as-a-service application allows users to log into a web-based service (e.g., via a web browser) which hosts all the programs resident in the cloud.

In an example, a plurality of users can access a local or cloud database (e.g., local database, cloud database, remote database, among others) computing platform (e.g., component 1210) via a web-based application on a computing device, such as a tablet, pad, laptop, cell phone, computer, or other component. The web-based application can allow a user to configure particular reports that quantify data in substantially any format and in comparison to any number of metrics, such as performance benchmarks and the like. Moreover, the software applications can be updated and distributed in a global fashion to insure that each user is using the latest and greatest technology.

Figure 13:
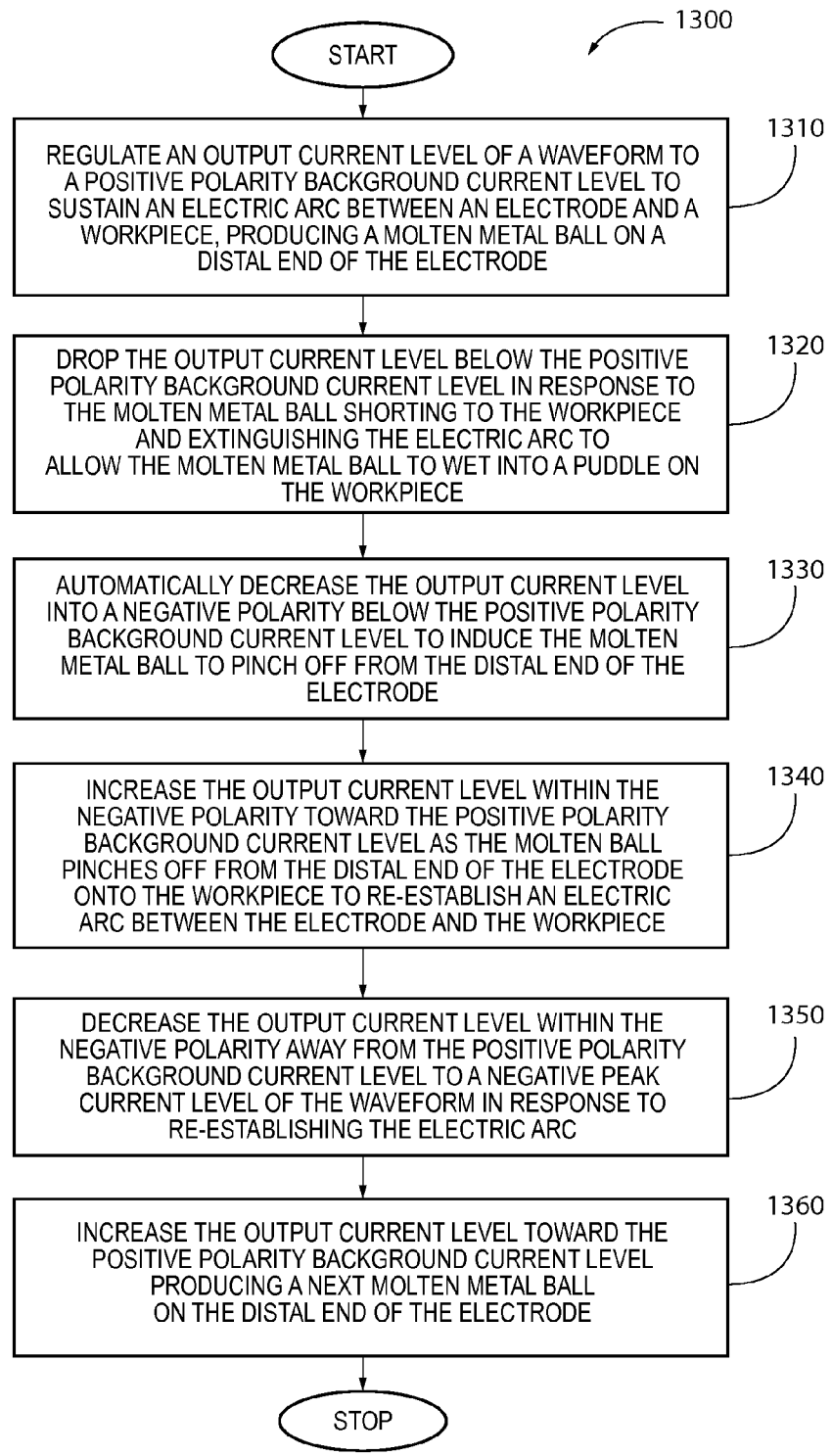
FIG. 13 is a flow diagram of generating a negative polarity welding output current waveform that controls a welding process.
Figure 14:
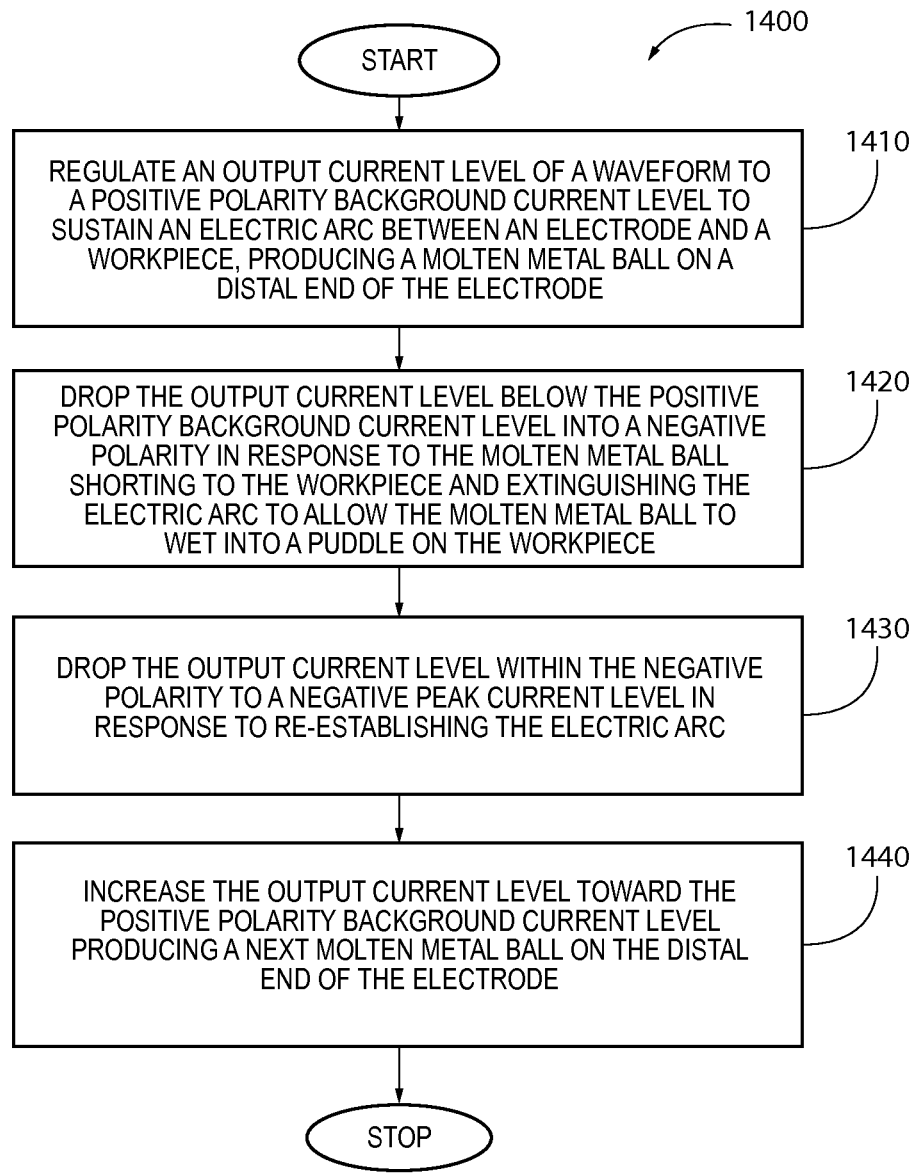
FIG. 14 is a flow diagram of utilizing a negative polarity of current for an arc welding current waveform to control a portion of a welding process.

In view of the exemplary devices and elements described supra, methodologies that may be implemented in accordance with the disclosed subject matter will be better appreciated with reference to the flow charts and/or methodologies of FIGS. 13-14. The methodologies and/or flow diagrams are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods and/or flow diagrams described hereinafter.

Sequentially, the following occurs as illustrated in the decision tree flow diagram 1300 of FIG. 13 which is a flow diagram 1300 that generates a negative polarity welding output current waveform that controls a welding process such as, for instance, a GMAW process. An output current level of a waveform is regulated to a positive polarity background current level to sustain an electric arc between an electrode and a workpiece, producing a molten metal ball on a distal end of the electrode (reference block 1310). The output current level is dropped below the positive polarity background current level in response to the molten metal ball shorting to the workpiece and extinguishing the electric arc to allow the molten metal ball to wet into a puddle on the workpiece (reference block 1320). The output current level is automatically decreased into a negative polarity below the positive polarity background current level to induce the molten metal ball to pinch off from the distal end of the electrode (reference block 1330). The output current level is increased within the negative polarity toward the positive polarity background current level as the molten ball pinches off from the distal end of the electrode onto the workpiece to re-establish an electric arc between the electrode and the workpiece (reference block 1340). The output current level is decreased within the negative polarity away from the positive polarity background current level to a negative peak current level of the waveform in response to re-establishing the electric arc (reference block 1350). The output current level is increased toward the positive polarity background current level producing a next molten metal ball on the distal end of the electrode (reference block 1360).

In an embodiment, method 1300 relates to an arc welding process as a gas metal arc welding (GMAW) process, wherein the GMAW process uses argon and $CO_2$ as shielding gases. In an embodiment, method 1300 includes heating the electrode more than the puddle with the output current level within the negative polarity. In an embodiment, method 1300 includes utilizing the negative peak current level of the waveform to produce the next molten metal ball on the distal end of the electrode. In an embodiment, the method 1300 includes pulsing the output current level between the positive polarity background current level and an intermediate positive current level, wherein the intermediate positive current level is greater than the positive polarity background current level and less than an absolute value of the negative peak current level. In an embodiment, method 1300 includes pulsing the output current level between the positive polarity background current level and an intermediate negative current level, wherein the intermediate negative current level is less than the positive polarity background current level and less than an absolute value of the negative peak current level. In an embodiment, method 1300 includes pulsing the output current level at a predefined pulse rate until the next short is established between the next molten metal ball and the workpiece.

FIG. 14 illustrates flow diagram 1400 related to utilizing a negative polarity of current for an arc welding current waveform to control a portion of a welding process. An output current level of a waveform is regulated to a positive polarity background current level to sustain an electric arc between an electrode and a workpiece, producing a molten metal ball on a distal end of the electrode (reference block 1410). The output current level is dropped below the positive polarity background current level into a negative polarity in response to the molten metal ball shorting to the workpiece and extinguishing the electric arc to allow the molten metal ball to wet into a puddle on the workpiece (reference block 1420). The output current level is dropped within the negative polarity to a negative peak current level in response to re-establishing the electric arc (reference block 1430). The output current level is increased toward the positive polarity background current level producing a next molten metal ball on the distal end of the electrode (reference block 1440).

In an embodiment, method 1400 employs the arc welding process as a gas metal arc welding (GMAW) process, wherein the GMAW process uses argon and $CO_2$ as shielding gases. In an embodiment, method 1400 includes heating the electrode more than the puddle with the output current level within the negative polarity. In an embodiment, method 1400 includes utilizing the output current level within the negative polarity to mitigate depression of the puddle from the molten metal ball pinching off from the distal end of the electrode. In an embodiment, method 1400 includes pulsing the output current level between the positive polarity background current level and an intermediate positive current level, wherein the intermediate positive current level is greater than the positive polarity background current level and less than an absolute value of the negative peak current level. In an embodiment, method 1400 includes pulsing the output current level between the positive polarity background current level and an intermediate negative current level, wherein the intermediate negative current level is less than the positive polarity background current level and less than an absolute value of the negative peak current level. In an embodiment, method 1400 includes pulsing the output current level at a pre-defined pulse rate until the next short is established between the next molten metal ball and the workpiece.

In an embodiment, a welding system that promotes droplet transfer can include regulating an output current level of a waveform to a positive polarity background current level to sustain an electric arc between an electrode and a workpiece in order to producing a molten metal ball on a distal end of the electrode, detecting a short circuit event in the welding system, changing the positive polarity background current to a current level to increase a pinch off of a droplet from a distal end of an electrode based upon the short circuit event, re-creation of an arc after detachment of the droplet, controlling a transition from the current level to the positive polarity background current, and/or pulsing the positive background current to promote the droplet on the distal end of the electrode to touch a puddle. Furthermore, the embodiment can include utilizing a negative polarity for the current level. In an embodiment, the system can include regulating an output current level of a waveform to the positive polarity background current level to sustain the arc between the electrode and a workpiece, producing the droplet on the distal end of the electrode, dropping the output current level below the positive polarity background current level into a negative polarity in response to the droplet shorting to the workpiece and extinguishing the arc to allow the droplet to wet into a puddle on the workpiece, dropping the output current level within the negative polarity to a negative peak current level in response to re-establishing the arc, and/or increasing the output current level toward the positive polarity background current level producing a next droplet on the distal end of the electrode.

Figure 15:
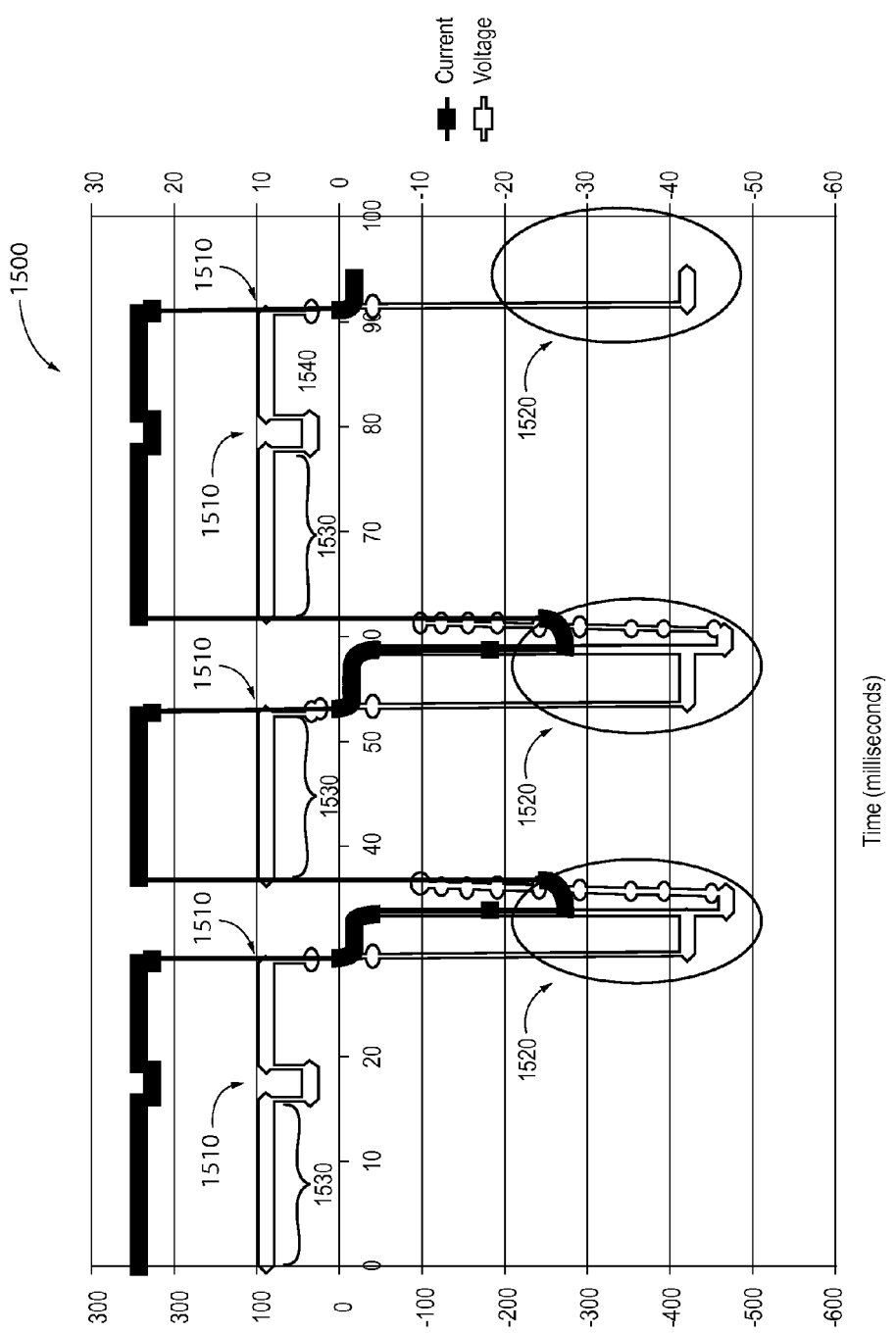
FIG. 15 is a graph illustrating arc welding current waveforms with a negative polarity that control a portion of a welding process.

FIG. 15 illustrates graph 1500 that illustrates arc welding current waveform having a negative polarity in order to control a portion of a welding process. Graph 1500 includes one or more pulses 1510, STT 1520, background current 1530, and background current between pulses 1540. Graph 1500 is depicted solely as an example and it not to be limiting on the subject innovation. For instance, values (e.g., time, current, voltage, wire speed, wire gauge, wire feed rate, among others) are used solely for example and other values can be selected with sound engineering judgment.

In an embodiment illustrated with graph 1500, 0.052 wire is used at 277 inches per minute (IPM) wire feed speed (WFS), above a short arc/globular transition (e.g., ER70S-6 mild steel shielded under 100% CO2). This can be performed with 100% CO2, wherein a gas that at this WFS can be very spatter and hard to control. One or more pulses 1510 can reduce output instead of increasing output. Here, reducing arc force on the droplet promotes a short circuit. In a conventional globular transfer, the droplet hangs on for a very long time before it touches the puddle.

If the droplet does not touch, then the output is restored and one or more pulses 1510 are used again at a later time. This oscillation of the droplet promotes it to touch the puddle and transfer before conventional globular transfer techniques. Background current 1530 is held for a relatively long time compared to short arc (e.g., on the order of 16 milliseconds versus 1 second). A system needs to have power and the positive background segment provides this power while the negative segment puts power into the wire but relatively not the puddle. Short clearing routine can be a defined current and not a ramp. The droplet is very large and the power source limited so a high current promotes a stable detachment.

In an embodiment, the short clearing ramp is an absolute current of 420 amps. In an embodiment, one or more pulses 1510 reduced power to allow droplet to touch puddle under low power. In an embodiment, background time is 16 milliseconds to obtain required power to make process work. In an embodiment, if a droplet does not touch puddle, the output is set back to background to add more power.

In an embodiment, background current 1530 and/or 1540 can be at 92 amps with a duration of 16 ms (e.g., a longer duration when compared to a pulse time of 1.5 ms to act to put heat into the system). Furthermore, a pulse current can be 40 amps with a duration of 3 ms (e.g., during the pulses, the current can be dropped to promote the droplet to touch the puddle). If the droplet does not touch within 3 ms, the background can be restored for 10 ms. Additionally, shorting current can be 420 amps and peak current can be 470 amps. It is to be appreciated that the actual times and currents are solely for example to provide a relative scale for use with CO2, a self shielded wire, among others.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A method of promoting droplet transfer of a welding system, comprising:
    transitioning a waveform between a positive polarity above zero and a negative polarity below zero within a repeated cycle, wherein the cycle includes the following:
    regulating an output current level of the waveform to a positive polarity background current level to sustain an electric arc between an electrode and a workpiece, producing a molten metal ball on a distal end of the electrode;
    dropping the output current level below the positive polarity background current level to approximately zero in response to the molten metal ball being produced, shorting to the workpiece and extinguishing the electric arc to allow the molten metal ball to wet into a puddle on the workpiece;
    automatically further decreasing the output current level into a negative polarity below approximately zero in response to the molten metal ball wetting into the puddle to induce the molten metal ball to pinch off from the distal end of the electrode;
    increasing the output current level within the negative polarity toward approximately zero as the molten ball pinches off from the distal end of the electrode onto the workpiece to re-establish an electric arc between the electrode and the workpiece;
    decreasing the output current level within the negative polarity below approximately zero to a negative peak current level of the waveform in response to re-establishing the electric arc; and
    increasing the output current level above zero to the positive polarity background current level producing a next molten metal ball on the distal end of the electrode;
    providing at least one heat-increasing current pulse wherein the output current level is between the positive polarity background current level and an intermediate positive current level in the positive polarity at the end of the cycle to maintain a temperature of the puddle, wherein the intermediate positive current level is greater than the positive polarity background current level and less than an absolute value of the negative peak current level re-establishing the arc and a duration of pulsing the output current level is based on a wire feed speed;
    the combination of steps repeated to promote the droplet transfer of the welding system.

2. The method of claim 1, wherein
    the arc welding process is a gas metal arc welding (GMAW) process.

3. The method of claim 2, wherein
    the GMAW process uses argon and $CO_2$ as shielding gases.

4. The method of claim 1, further comprising heating the electrode more than the puddle with the output current level within the negative polarity.

5. The method of claim 1, further comprising utilizing the negative peak current level of the waveform to produce the next molten metal ball on the distal end of the electrode.

6. A method of promoting droplet transfer of a welding system, comprising:
    transitioning a waveform between a positive polarity above zero and a negative polarity below zero within a repeated cycle, wherein the cycle includes the following:
    regulating an output current level of the waveform to a positive polarity background current level in the positive polarity to sustain an electric arc between an electrode and a workpiece, producing a molten metal ball on a distal end of the electrode;
    dropping the output current level within the negative polarity to a negative peak current level in response to re-establishing the electric arc;
    increasing the output current level into the positive polarity toward the positive polarity background current level producing a next molten metal ball on the distal end of the electrode;
    providing at least one heat-increasing current pulse wherein the output current level is between the positive polarity background current level and an intermediate positive current level in the positive polarity at the end of the cycle to maintain a temperature of the puddle, wherein the intermediate positive current level is greater than the positive polarity background current level and less than an absolute value of the negative peak current level re-establishing the arc and a duration of pulsing the output current level is based on a wire feed speed;
    the combination of steps repeated to promote the droplet transfer of the welding, system.

7. The method of claim 6, wherein
    the arc welding process is a gas metal arc welding (GMAW) process.

8. The method of claim 7, wherein
    the GMAW process uses argon and $CO_2$ as shielding gases.

9. The method of claim 6, further comprising
    heating the electrode more than the puddle with the output current level within the negative polarity.

10. The method of claim 6, further comprising utilizing the output current level within the negative polarity to mitigate depression of the puddle from the molten metal ball pinching off from the distal end of the electrode.

11. A method of promoting droplet transfer of a welding system, comprising:
    transitioning a waveform between a positive polarity above zero and a negative polarity below zero within a repeated cycle, wherein the cycle includes the following:
    regulating an output current level of the waveform to a positive polarity background current level to sustain an electric arc between an electrode and a workpiece, producing a molten metal ball on a distal end of the electrode;

dropping the output current level below the positive polarity background current level to approximately zero in response to the molten metal ball being produced, shorting to the workpiece and extinguishing the electric arc to allow the molten metal ball to wet into a puddle on the workpiece;

automatically further decreasing the output current level into a negative polarity below approximately zero in response to the molten metal ball wetting into the puddle to induce the molten metal ball to pinch off from the distal end of the electrode;

increasing the output current level within the negative polarity toward approximately zero as the molten ball pinches off from the distal end of the electrode onto the workpiece to re-establish an electric arc between the electrode and the workpiece;

decreasing the output current level within the negative polarity below approximately zero to a negative peak current level of the waveform in response to re-establishing the electric arc; and increasing the output current level above zero to the positive polarity background current level producing a next molten metal ball on the distal end of the electrode, wherein in response to the step of increasing the output current level above zero to the positive polarity background current level producing a next molten metal ball on the distal end of the electrode, a temperature of the puddle is maintained by a current pulse at the end of the cycle, the current pulse comprising at least one of:

(a) a positive portion comprising pulsing the output current level between the positive polarity background current level in the positive polarity and an intermediate positive current level in the positive polarity at the end of the cycle, wherein the intermediate positive current level is greater than the positive polarity background current level and less than an absolute value of the negative peak current level and a duration of pulsing the output current level is based on a wire feed speed;

(b) a negative portion comprising pulsing the output current level between the positive polarity background current level in the positive polarity and an intermediate negative current level in the negative polarity at the end of the cycle, wherein the intermediate negative current level is less than the positive polarity background current level and less than an absolute value of the negative peak current level and a duration of pulsing the output current level is based on the wire feed speed; or (c) alternating between the positive portion wherein the intermediate positive current level is greater than the positive polarity background current level and less than an absolute value of the negative peak current level and the negative portion wherein the intermediate negative current level is less than the positive polarity background current level and less than an absolute value of the negative peak current level;

the combination of steps repeated to promote the droplet transfer of the welding system.

* * * * *